(12) United States Patent
Winarski

(10) Patent No.: US 8,663,771 B2
(45) Date of Patent: Mar. 4, 2014

(54) OPTICAL MEDIA HAVING GRAPHENE WEAR PROTECTION LAYERS

(71) Applicant: Tyson York Winarski, Mountain View, CA (US)

(72) Inventor: Tyson York Winarski, Mountain View, CA (US)

(*) Notice: Subject to any disclaimer, the term of this patent is extended or adjusted under 35 U.S.C. 154(b) by 0 days.

(21) Appl. No.: 13/887,322

(22) Filed: May 5, 2013

(65) Prior Publication Data

US 2013/0302553 A1 Nov. 14, 2013

Related U.S. Application Data

(60) Provisional application No. 61/646,317, filed on May 13, 2012, provisional application No. 61/652,837, filed on May 29, 2012, provisional application No. 61/668,449, filed on Jul. 6, 2012.

(51) Int. Cl.
*G11B 7/24* (2013.01)

(52) U.S. Cl.
USPC .............. 428/64.1; 428/64.4; 430/270.11

(58) Field of Classification Search
USPC ........ 428/6.1, 64.4; 430/270.11, 270.12, 270, 430/13
See application file for complete search history.

(56) References Cited

U.S. PATENT DOCUMENTS

| | | | |
|---|---|---|---|
| 5,492,769 A | 2/1996 | Pryor et al. | |
| 5,725,931 A * | 3/1998 | Landin et al. | 428/134 |
| 6,936,322 B2 | 8/2005 | Sakakibara et al. | |
| 2001/0055700 A1 | 12/2001 | Dykes et al. | |
| 2009/0169870 A1 | 7/2009 | Zheng | |
| 2010/0068444 A1 * | 3/2010 | Asplund et al. | 428/64.5 |
| 2010/0140792 A1 | 6/2010 | Haddon et al. | |
| 2011/0151278 A1 | 6/2011 | Gurney et al. | |
| 2011/0217544 A1 | 9/2011 | Young et al. | |

FOREIGN PATENT DOCUMENTS

| | | |
|---|---|---|
| WO | WO2009123771 A2 | 8/2009 |
| WO | WO2011136478 A2 | 3/2011 |
| WO | WO2013014935 A1 | 1/2013 |

OTHER PUBLICATIONS

Cinzia Casiraghi, John Robertson, Andrea Ferrari. Diamond Like Carbon for Data Storage. Materials Today Jan.-Feb. 2007, vol. 10, No. 1-2. ISSN: 1369 7021 (http://carbon.utsi.edu/downloads/dlc_data_beer.pdf).

* cited by examiner

*Primary Examiner* — Elizabeth Mulvaney
(74) *Attorney, Agent, or Firm* — The Winarski Firm, PLLC

(57) ABSTRACT

An optical storage medium is disclosed that includes an optical disc having layers of graphene on one or both sides of the disc to provide wear protection against scratches and mechanical abrasion. Grahpene is a hard material that is 97.7% optically transparent. Thus, layers of graphene at or near the exterior sides of an optical disc provide wear protection to the optical media from mechanical abrasion and scratches while allowing laser light to pass through the graphene layers to read or write to the optical media.

20 Claims, 24 Drawing Sheets

OPTICAL MEDIA HAVING GRAPHENE WEAR PROTECTION LAYERS

SPECIFICATION

This application claims the benefit of U.S. Provisional Application No. 61/646,317, filed May 13, 2012, U.S. Provisional Application No. 61/652,837 filed on May 29, 2012, and U.S. Provisional Application No. 61/668,449 filed on Jul. 6, 2012.

BACKGROUND

An optical disc is a flat, usually circular disc that encodes binary data (bits). One form of optical recording has pits representing a binary value of 0 or "off," due to lack of reflection when read, and lands representing a binary value of 1 or "on," due to a reflection when read. The pits and lands are covered with a special reflective material. In another form of optical recording, the transition between pit and land represents the binary value of 1 and the intervening length of pit or land between the pit-land transitions represents one or more successive zeros. For read-only-memory "ROM" optical disks, the depth of the stamped pit is typically ¼ of the wavelength of the laser reading the data, and the ensuing cancellation of the light reflected off the bottom of the pit with the incoming light makes the pit appear dark compared to the surrounding land. For "ROM" optical disks, the lands and stamped pits are covered by a reflective material such as aluminum or gold, and the laser can read through one data layer of the optical disk to subsequent inner data layers. For rewritable "RW" optical disks, the pit does not have a change in depth from the surrounding land, but it is actually a second-phase of a phase-change recording layer, and this phase appears darker than the surrounding first-phase of this same phase-change recording layer. An optical dye can be used as the recording material in write-once, read-many "WORM" optical disks, where the laser essentially creates a permanent mark on the disk, herein called a pit. "ROM," rewriteable "RW," and "WORM" optical disks may have the same recording format, as is the case for Digital Versatile Disks (DVD) and BLU-RAY Disks (BD) so that DVD disks can be read by the same DVD player, and BD disks can be read by the same BD player. The encoding material sits atop a thicker substrate (usually polycarbonate) that makes up the bulk of the disc and forms a dust-defocusing layer. The encoding pattern follows a continuous, spiral path which encompasses the disc's data-surface and extending from the innermost track to the outermost track. The data is stored on the disc with a laser or stamping machine, and can be accessed when the data path is illuminated with a laser diode in an optical disc drive which spins the disc at speeds of about 200 to 4000 RPM (revolutions per minute) or more, depending on the drive type, disc format, and the distance of the read head from the center-of-rotation of the disc (inner tracks are read at a faster disc RPM for constant-linear-velocity "CLV" discs). Typical layer wavelengths are 405 nm for a blue-laser (typical for BD), 650 nm for red-laser (typical for DVD), and 780 nm for infrared laser (typical for CD or compact disks). The shorter the laser wavelength, the more narrow the width of the pits, which allows for more revolution of the spiral track of data, hence the higher the data capacity. The pits, which may be called bumps if the disks are observed upside-down, and the spiral track itself, distort ambient light, hence most optical discs characteristically have an iridescent appearance to the human eye, one created by the groove of the spiral track and the reflective layer. The reverse side of an optical disc usually has a printed label, sometimes made of paper but often printed or stamped onto the disc itself. This side of the disc contains the actual data and is typically coated with a transparent material, usually lacquer. Unlike the 3½-inch floppy disc, most optical discs do not have an integrated protective casing and are therefore susceptible to data transfer problems due to scratches, fingerprints, and other environmental problems.

Optical discs are usually between 7.6 and 30 cm (3 to 12 in) in diameter, with 12 cm (4.75 in) being the most common size. A typical disc is about 1.2 mm (0.05 in) thick, while the track pitch (distance from the center of one track to the center of the next) is typically 1.6 µm.

An optical disc is designed to support one of three recording types: read-only (e.g.: CD, CD-ROM, DVD, DVD-ROM), recordable (write-once, e.g. CD-R, DVD-R, BD-R), or re-recordable (rewritable, e.g. CD-RW, DVD-RW, and BD-RW). Write-once optical discs commonly have an organic-dye recording layer between the substrate and the reflective layer. Rewritable discs typically contain an alloy recording layer composed of a phase-change material, most often AgInSbTe, an alloy of silver, indium, antimony, and tellurium.

Optical discs include CDs, DVDs, and BLU-RAY. Optical discs are most commonly used for storing music (e.g. for use in a CD player), video (e.g. for use in a BLU-RAY player), or data and programs for personal computers (PC). The Optical Storage Technology Association (OSTA) promotes standardized optical storage formats. Although optical discs are more durable than earlier audio-visual and data storage formats, they are susceptible to environmental and daily-use damage. Libraries and archives enact optical media preservation procedures to ensure continued usability in the computer's optical disc drive or corresponding disc player.

Optical disc offers a number of advantages over magnetic storage media. An optical disc holds much more data. The greater control and focus possible with laser beams (in comparison to tiny magnetic heads) means that more data can be written into a smaller space. Storage capacity increases with each new generation of optical media. Emerging standards, such as BLU-RAY, offer up to 27 gigabytes (GB) on a single-sided 12-centimeter disc. In comparison, a 3.5" floppy diskette, for example, can hold 1.44 megabytes (MB). Thus, one BLU-RAY disk can hold the equivalent of 18,750 3.5" floppy diskettes. Optical discs are inexpensive to manufacture and data stored on them is relatively impervious to most environmental threats, such as power surges, or magnetic disturbances.

Optical discs may have a single-sided or dual-sided configuration. Each side may have a single or multiple layers of optical media. Currently single or dual layers are common. However, multiple layers such as 3, 4 or greater may be formed in the future, particularly for the BLU-RAY disk as the depth of the BD recording layer within the surrounding substrate is less than for DVD. DVD kept the CD depth of the recording layer, for commonality between DVD and CD disks, but this greater recording depth within the surrounding substrate caused more optical-distortion for higher densities. Thus BD disks, with their more-shallow depth of recording layer, afford the greatest potential for increases in data layers beyond two.

SUMMARY

An optical storage medium is disclosed that includes an optical disc having layers of graphene on one or both sides of the disc to provide wear protection against scratches and mechanical abrasion. Grahpene is a hard material that is 97.7% optically transparent. Thus, layers of graphene at or near the exterior sides of an optical disc provide wear protection to the optical media from mechanical abrasion and scatches while allowing laser light to pass through the graphene layers to read or write to the optical media.

In a one embodiment, the optical disc has an optical recording layer and a wear protection layer made of a graphene sheet. The wear protection layer may further include a matrix in which the graphene sheet is embedded. A portion of the graphene sheet that is embedded within the matrix may be exposed to an exterior environment. This portion could be the entire bottom portion of the graphene sheet. This portion may also be less than the entire bottom portion of the graphene sheet. The matrix may be formed of a material that is soluble to facilitate the embedding of the graphene sheet within the matrix when at least a portion of the material is in at least a partially dissolved state. When in an at least partially dissolved state, the graphene sheet is pressed into position in the matrix. The matrix is then hardened. The matrix may also be formed of a material that is softened by flash-heating to facilitate the embedding of the graphene sheet within the matrix when at least a portion of the material is in a softened state. This flash-heating may occur through use of a laser or infrared radiation pulse. The graphene layer is then pressed into position within the matrix when it is softened. The matrix is then allowed to cool and harden.

Still further, the matrix may also be formed of a material that is capable of having the graphene sheet embedded in it through a stamping process. The wear protection layer may further include a hard-coat layer. The graphene sheet can be encapsulated between the matrix and the hard-coat layer. Thus, the matrix and hard-coat layer encase the graphene sheet as if it were in a capsule. This matrix may be formed of a material capable of encapsulating a sheet of graphene, such as with one of these non-limiting exemplary materials: a glass, a polymer, or a resin.

The graphene sheet may form an exterior bottom surface of the disc, such that it is exposed to the exterior environment. In a further embodiment, the graphene sheet is attached to the disc with an adhesive.

In another embodiment, the wear protection layer further includes a matrix with the graphene sheet being encapsulated within the matrix. In a non-limiting example, the matrix is an adhesive. A non-limiting example of an adhesive is a cyanoacrylate. This adhesive may be spin-coated onto the disc, for example. However, any adhesive capable of bonding the graphene sheet to an optical disc is contemplated. The matrix, by another non-limiting example, may be formed of a glass, a polymer, or a resin. When encapsulated, it is contemplated that the matrix may be formed of a single material. In a still further embodiment, the optical disc has a wear protection layer that includes a seed layer upon which the graphene sheet is grown. Alternatively, the disc may have a hard-coating layer deposited over the deposited graphene sheet. In another embodiment, the optical disc may include a substrate and a second graphene sheet. The optical recording layer of this disc is between the second graphene sheet and the first graphene sheet.

In a still further embodiment, an optical disc is disclosed having an optical recording layer and a graphene layer encapsulated within a layer of the disc. In another embodiment, an optical disc is disclosed having an optical recording layer and a graphene layer embedded within a layer of the disc. The optical disc may also further include a layer of hard-coat. The graphene layer can be positioned between the recording layer and the layer of hard-coat. The layer of hard-coat can also be placed between the recording layer of and the layer of graphene. One non-limiting example of a hard-coat is diamond-like carbon. Another example of a hard-coat is magnesium fluoride. Other examples of hard-coating include UV curable resins. In one configuration, the wear protection layer includes a single sheet of graphene. In other configurations, the wear protection layer may be formed of multiple sheets of graphene.

In a preferred embodiment, an optical disc is disclosed that includes a disc having an optical recording layer and a wear protection layer having an annular sheet of graphene. It is preferred that the annular graphene sheet is formed of a single contiguous sheet of graphene. It is also preferred that the annular graphene sheet has a uniform thickness. In one embodiment, the annular graphene sheet is a monolayer of carbon atoms. The center of the annular graphene sheet is located at a center of the optical disc. The annular graphene sheet has an inner radius that has a length that is less than or equal to an inner radius of said optical recording layer. The annular graphene sheet also has an outer radius that has a length that is greater than or equal to an outer radius of said optical recording layer. In another embodiment, the wear protection layer may further include multiple annular graphene sheets. The multiple annular graphene sheets may be stacked vertically such that each of the annular graphene sheets shares a common center point. Alternatively, the multiple annular graphene sheets may have different inner and outer radii and are positioned on a plane as a series of concentric non-overlapping rings. Further, the annular sheet of graphene may be encapsulated within a matrix. Alternatively, the wear protection layer may further include a matrix in which the graphene sheet is embedded. In one embodiment, the matrix is formed of a material that is soluble to facilitate the embedding of the graphene sheet within the matrix when a at least a portion of the material is in at least a partially dissolved state. In an alternative embodiment, the matrix is formed of a material that is softened by flash-heating to facilitate the embedding of the graphene sheet within the matrix when at least a portion of the material is in a softened state. The graphene sheet may also be attached to the disc with an adhesive. Further, the wear protection layer may include a seed layer upon which the graphene sheet is deposited. In one embodiment, the annular graphene sheet is formed of a plurality of annular pie-shaped graphene wedges. The wear protection layer may further include a hard-coat layer and a matrix where the graphene sheet is encapsulated between the matrix and the hard-coat layer. The matrix may be made of a material such as an adhesive, a glass, a polymer, or a resin. The optical disc may further include a second annular sheet of graphene, such that the optical media is positioned between the two annular sheets of graphene.

In another embodiment, an optical disc includes a disc having an optical recording layer and multiple uniformly thick graphene sheets embedded within a layer of the disc. Alternatively, the optical disc includes a disc having an optical recording layer and a graphene sheet encapsulated within a layer of the disc.

Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

While the invention has been shown and described with reference to a particular embodiment thereof, it will be understood to those skilled in the art, that various changes in form and details may be made therein without departing from the spirit and scope of the invention.

An optical storage medium is disclosed that includes an optical disc having layers of graphene on one or both sides of the disc to provide wear protection against scratches and mechanical abrasion. Grahpene is a hard material that is 97.7% optically transparent. Thus, layers of graphene near the exterior sides of an optical disc provide wear protection to the optical media from mechanical abrasion and scratches while allowing laser light to pass through the graphene layers to read from or write to the optical media.

Graphene may be described as a flat monolayer of carbon atoms that are tightly packed into a two-dimensional (2D) honeycomb lattice. The carbon-carbon bond length in graphene is about 0.142 nanometers. The observed 97.7% optical transparency of graphene has been linked to the value of the fine structure constant by using results for non-interacting Dirac fermions.

Figure 1:
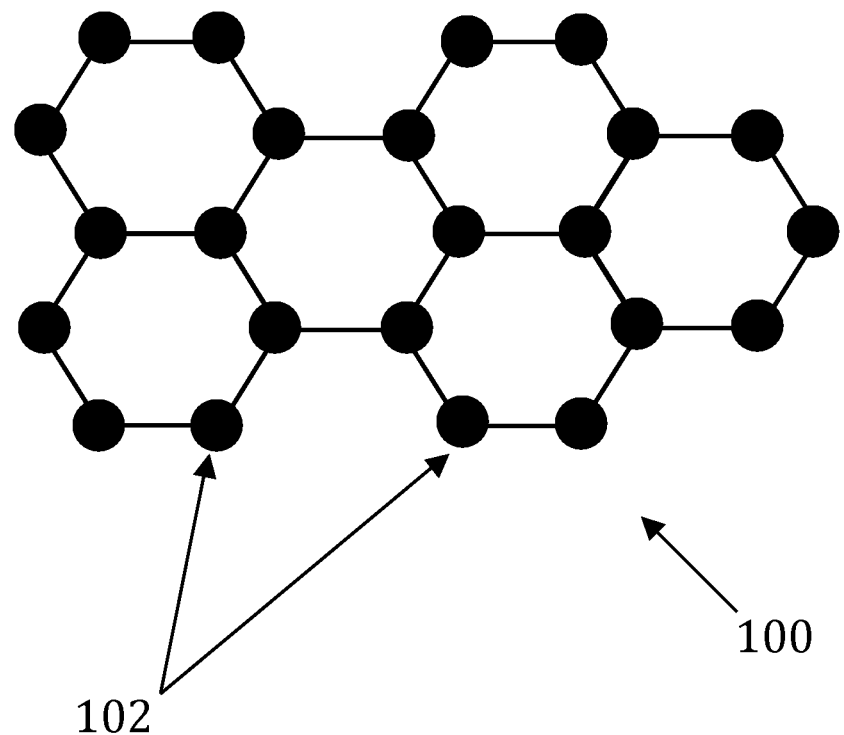
FIG. 1 is an illustration of a graphene lattice.

FIG. 1 is an illustration of a graphene lattice 100. Graphene lattice 100, also referred to as a sheet of graphene 100, is a flat monolayer of carbon atoms 102 that are tightly packed into a two-dimensional lattice, thereby forming a sheet of graphene. Graphene lattice 100 is 97.7% optically transparent. Thus, laser light used in combination with optical media can pass through a graphene layer for purposes of reading and writing data. Graphene lattice 100 is an extremely strong material due to the covalent carbon-carbon bonds. It is desirable to utilize graphene lattices 100 that are defect free as the presence of defects reduces the strength of graphene lattice 100. The intrinsic strength of a defect free sheet of graphene 100 is 42 $Nm^{-1}$, making it one of the strongest materials known. The strength of graphene is comparable to the hardness of diamonds.

Figure 2:
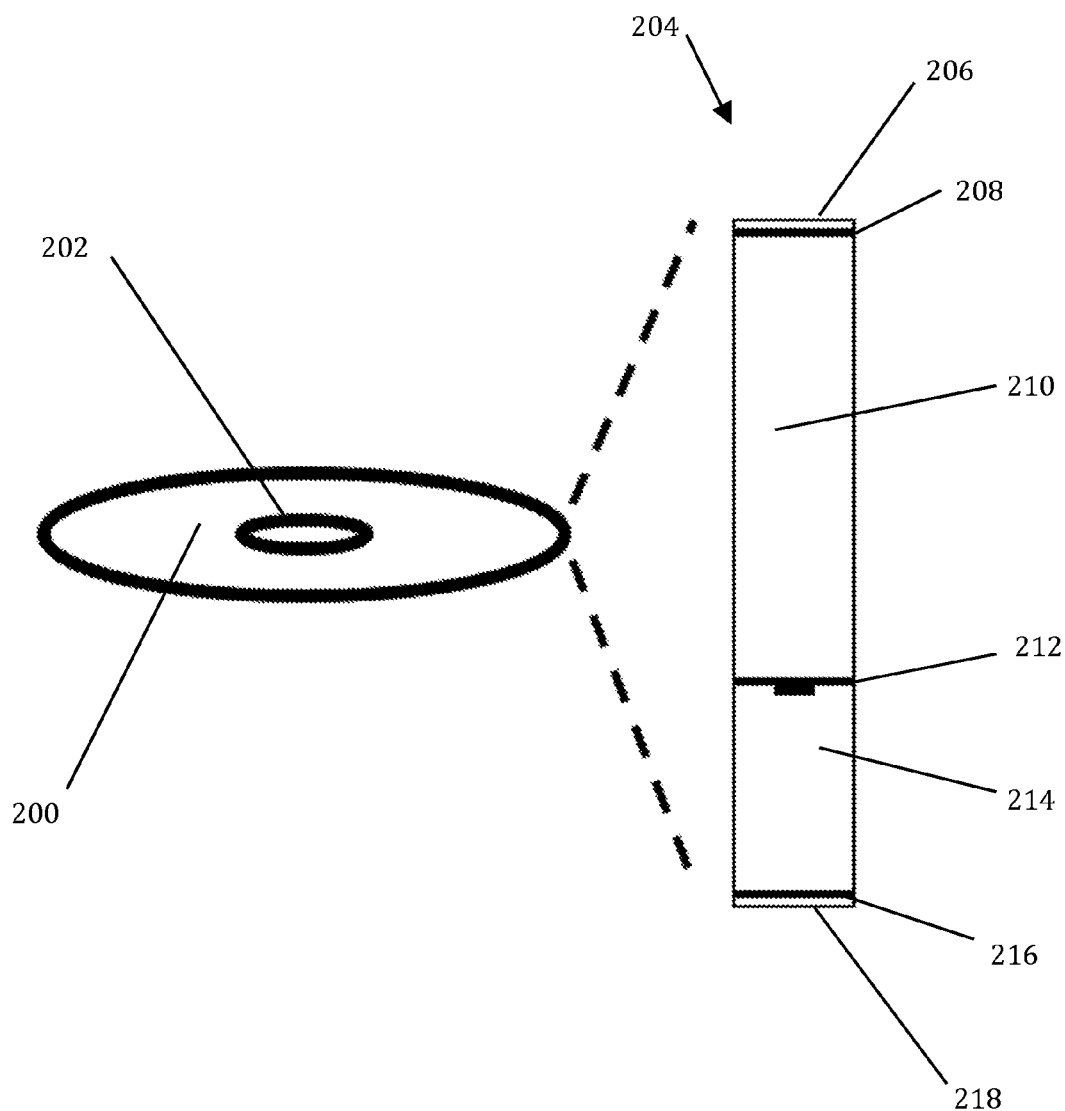
FIG. 2 is an illustration of an exemplary cross-section of a single-sided, single-layer optical media disc.

FIG. 2 is an illustration of an exemplary cross-section 204 of a single-sided, single-layer optical media disc 200. Optical media disc 200 may be a CD, a DVD, a BLU-RAY, or configured to have another optical media format. Optical media disc 200 is configured to store data that is read optically by a laser. Optical media disc 200 can have a read only, a recordable, or a re-recordable optical media. Optical media disc 200 has an inner circular portion 202 that mates with an optical drive for rotating the optical media over a laser and photodetector for read/write operations.

Cross-section 204 of optical media disc 200 is provided adjacent to disc 200. Starting from the top of the cross-section 204, matrix layer 206 embeds or encapsulates one or more sheets of graphene 100. Matrix layer 206 may, for example, be formed of an adhesive that is spin coated onto disc 200 in a liquid form. Exemplary adhesives for matrix layer 206 include, but are not limited to, cyanoacrylates, such as methyl-2-cyanoacrylate and ethyl-2-cyanoacrylate. Any adhesive capable of bonding a graphene sheet 100 to disc 200 is contemplated. While in a liquid form, one or more sheets of graphene may be placed into matrix layer 206. Once the one or more sheets of graphene are placed into matrix layer 206, the liquid adhesive may then be cured. Other materials for matrix layer 206 include a polymer, resin, or glass. For example, a resin may be spin coated on in a liquid form. While in liquid form, a graphene sheet 100 may be placed within the resin. Then the resin may be hardened, such as for example by UV light in conjunction with a UV curable resin.

Hard-coat layer 208 is a layer of a hard material currently used on optical media to provide wear resistance to protect the optical media 212. The use of matrix layer 206 greatly enhances the wear protection afforded to optical media 212 due to the graphene sheet 100. The use of hard-coat layer 208 is optional. Hard-coat layer 208 may be formed of a polymer, glass, diamond-like carbon, or other hard-coating material. Layer 210 is a substrate layer, commonly formed of polycarbonate. Recording layer 212 stores the data on optical media disc 200. Transparent cover layer 214 is provided between recording layer 212 and hard-coating layer 216. Below hard-coating layer 216 is a second matrix layer 218 that embeds or encapsulates a sheet of graphene 100. Note that the use of hard-coating layers 208 and 216 is optional. The use of matrix layer 206 is also optional. Typically, substrate 210 provides the only protection to the top portion of disc 200.

Due to the extreme strength of graphene sheets 100, matrix layers 218 and 206 provide significant wear protection to optical disc 200. This high strength of matrix layers 206 and 218 compliments the wear protection provided by optional hard-coatings 208 and 216. One non-limiting example of a hard-coat is diamond-like carbon. Another example of a hard-coat is magnesium fluoride. Note that the positions of the hard-coating layers 216 and 208 can be interchanged with matrix layers 206 and 218. As currently shown, matrix layers 206 and 218 are on the outer most surface of disc 200. In an alternative configuration, hard-coating layers 208 and 216 form the outer most surface of disc 200, and matrix layer 206 with graphene sheets 100 is positioned between hard-coating layer 208 and substrate 210. Similarly, in this alternative embodiment, matrix layer 218 may be placed between hard-coating layer 216 and transparent cover layer 214.

Figure 3:
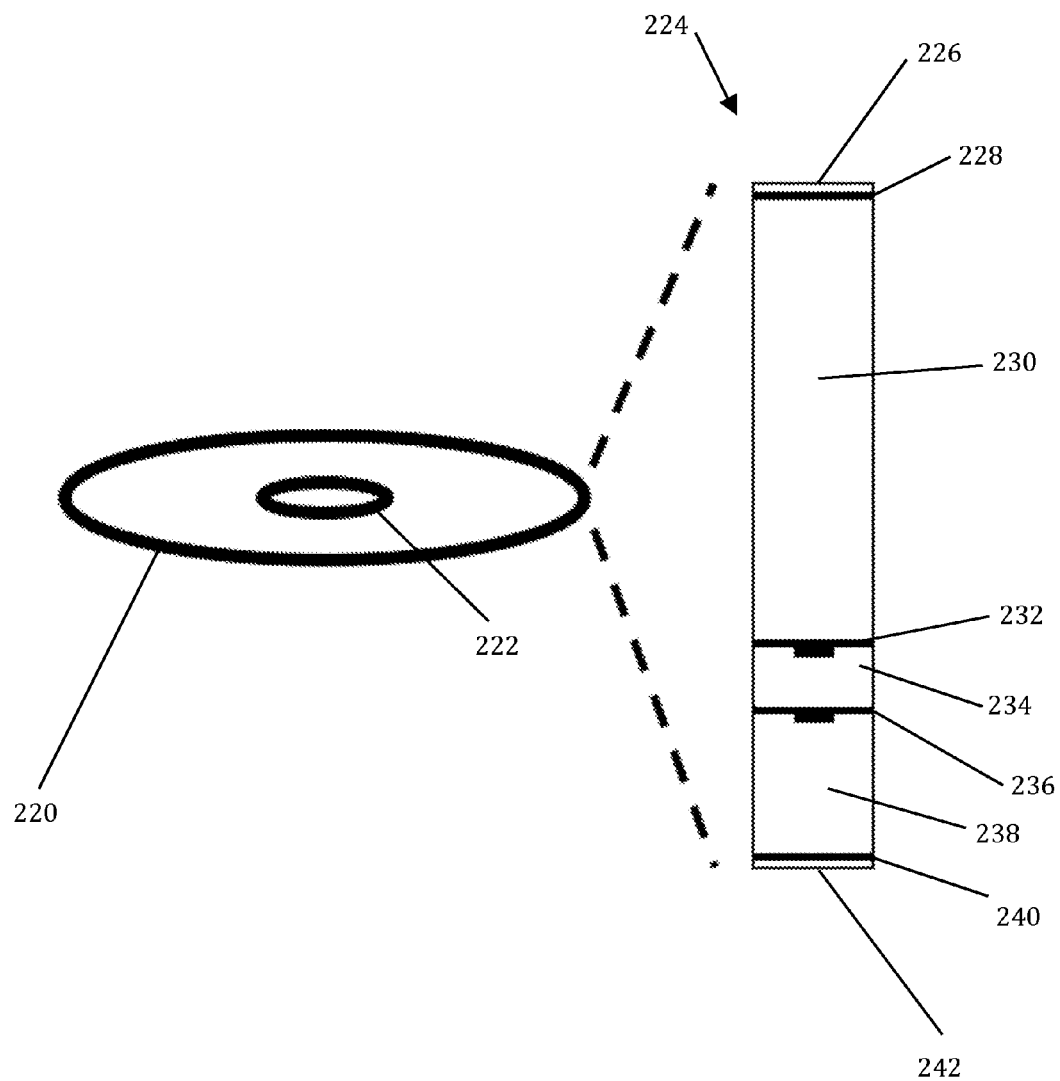
FIG. 3 is an illustration of an exemplary cross-section of a single-sided, dual-layer optical media disc.

FIG. 3 is an illustration of an exemplary cross-section 224 of a single-sided, dual-layer optical media disc 220. Optical media disc 220 may be a CD, a DVD, a BLU-RAY, or configured to have another optical media format. Optical media disc 220 is configured to store data that is read optically by a laser. Optical media disc 220 can have a read only, a recordable, or a re-recordable optical media. Optical media disc 220 has an inner-circular portion 222 that mates with an optical drive for rotating the optical media over a laser and photo-detector for read/write operations.

Cross-section 224 of optical media disc 220 is provided adjacent to disc 220. Starting from the top of the cross-section 224, matrix layer 226 embeds or encapsulates one or more sheets of graphene 100. Matrix layer 226 may be formed, for example, of an adhesive that is spin coated onto disc 220 in a liquid form. While in a liquid form, one or more sheets of graphene may be placed into matrix layer 226. Once the one or more sheets of graphene are placed into matrix layer 226, the liquid adhesive may then be cured. Other materials for matrix layer 226 include a polymer, resin or glass.

Hard-coat layer 228 is a layer of a hard material currently used on optical media to provide wear resistance to protect the optical media 232 and 234. The use of matrix layer 226 greatly enhances the wear protection afforded to optical media recording layers 232 and 236 due to the graphene sheet 100. The use of hard-coat layer 228 is optional. Hard-coat layer 228 may be formed of a polymer, glass, diamond-like carbon, or other hard-coating material. Layer 230 is a substrate layer, commonly formed of polycarbonate. Recording layers 232 and 236 stores the data on optical media disc 200.

The use of matrix layer 226 is optional. It is common that the protection afforded to the top of disc 220 is provided by substrate 230.

A space layer 234 is provided between recording layers 232 and 236. Transparent cover layer 238 is provided between recording layer 236 and hard-coating layer 240. Below hard-coating layer 240 is a second matrix layer 242 that embeds or encapsulates a sheet of graphene 100. Note that the use of hard-coating layers 228 and 240 is optional. The use of matrix layer 226 is also optional. Typically, only substrate 230 provides protection to the top portion of disc 220. Due to the extreme strength of graphene sheets 100, matrix layers 242 and 226 provide significant wear protection to optical disc 220. This high strength of matrix layers 242 and 226 compliments the wear protection provided by hard-coatings 228 and 240. Note that the positions of the hard-coating layers 228 and 240 can be interchanged with matrix layers 226 and 242 as discussed with respect to FIG. 2.

Figure 4:
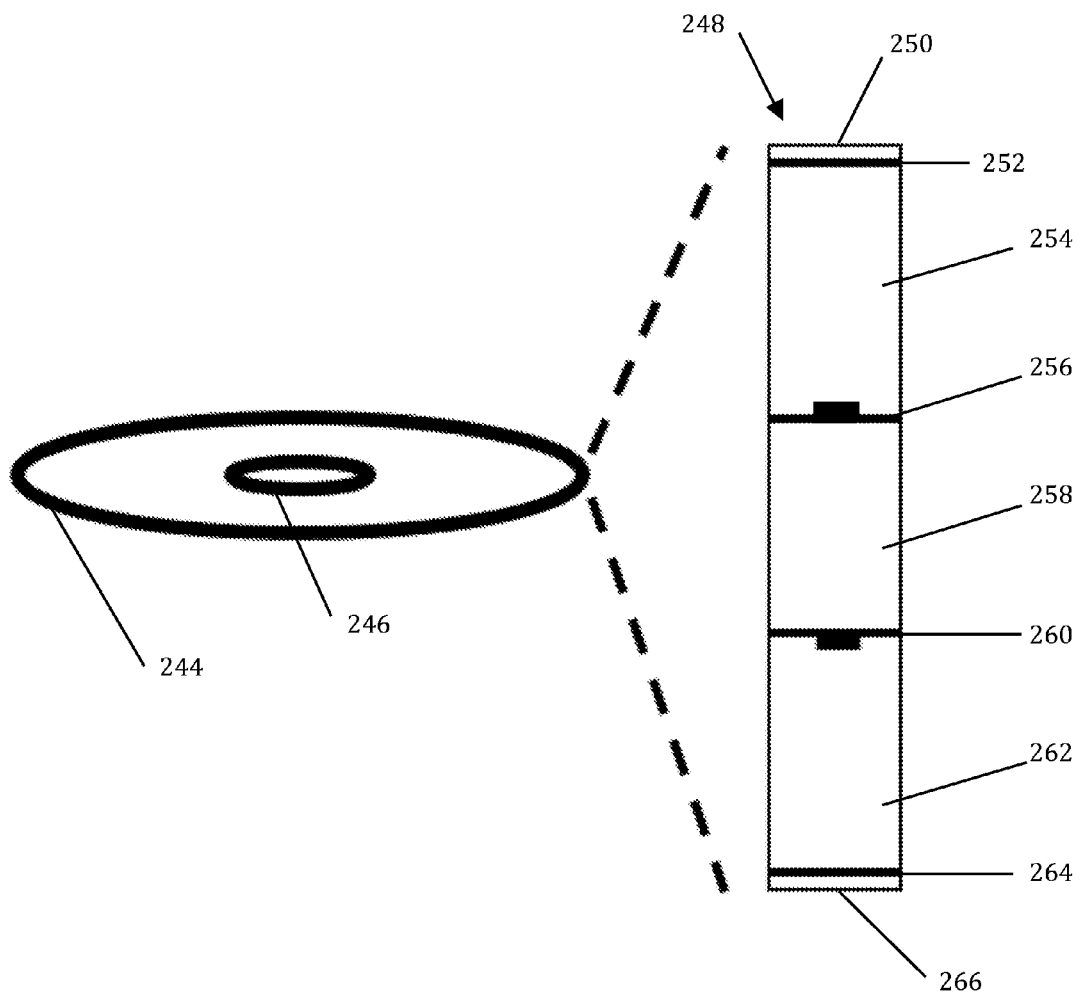
FIG. 4 is an illustration of an exemplary cross-section of a dual-sided, single-layer optical media disc.

FIG. 4 is an illustration of an exemplary cross-section 248 of a dual-sided, single-layer optical media disc 244. Optical media disc 244 may be a CD, a DVD, a BLU-RAY, or configured to have another optical media format. Optical media disc 244 is configured to store data that is read optically by a laser. Optical media disc 244 can have a read only, a recordable, or a re-recordable optical media. Optical media disc 244 has an inner circular portion 246 that mates with an optical drive for rotating the optical media over a laser and photo-detector for read/write operations.

Dual-sided single-layer optical media disc 244 has matrix layers 250 and 266 placed on either side of disc 244. Matrix layers 266 and 250 embed or encapsulate one or more sheets of graphene 100. Matrix layers 266 and 250 may be formed of an adhesive that is spin coated onto disc 244 in a liquid form. While in a liquid form, one or more sheets of graphene 100 may be placed into matrix layers 266 and 250. Once the one or more sheets of graphene 100 are placed into matrix layer 266 and 250, the liquid adhesive may then be cured. Other materials for matrix layers 266 and 250 include a polymer, resin or glass, for example.

Disc 244 also may include a pair of hard-coating layers 252 and 264 formed of a polymer, resin, glass, diamond-like carbon, or other hard-coating material. The use of hard-coating layers 252 and 264 is optional due to the high strength of matrix layers 250 and 266 that contain graphene sheets 100. The position of matrix layer 250 and hard-coating layer 252 may be interchanged. Similarly, the position of matrix layer 266 and hard-coating layer 264 may be interchanged. A spacer layer 258 is placed between recording layers 256 and 260. Transparent cover layers 254 and 262 are positioned adjacent recording layers 256 and 260 respectively.

Figure 5:
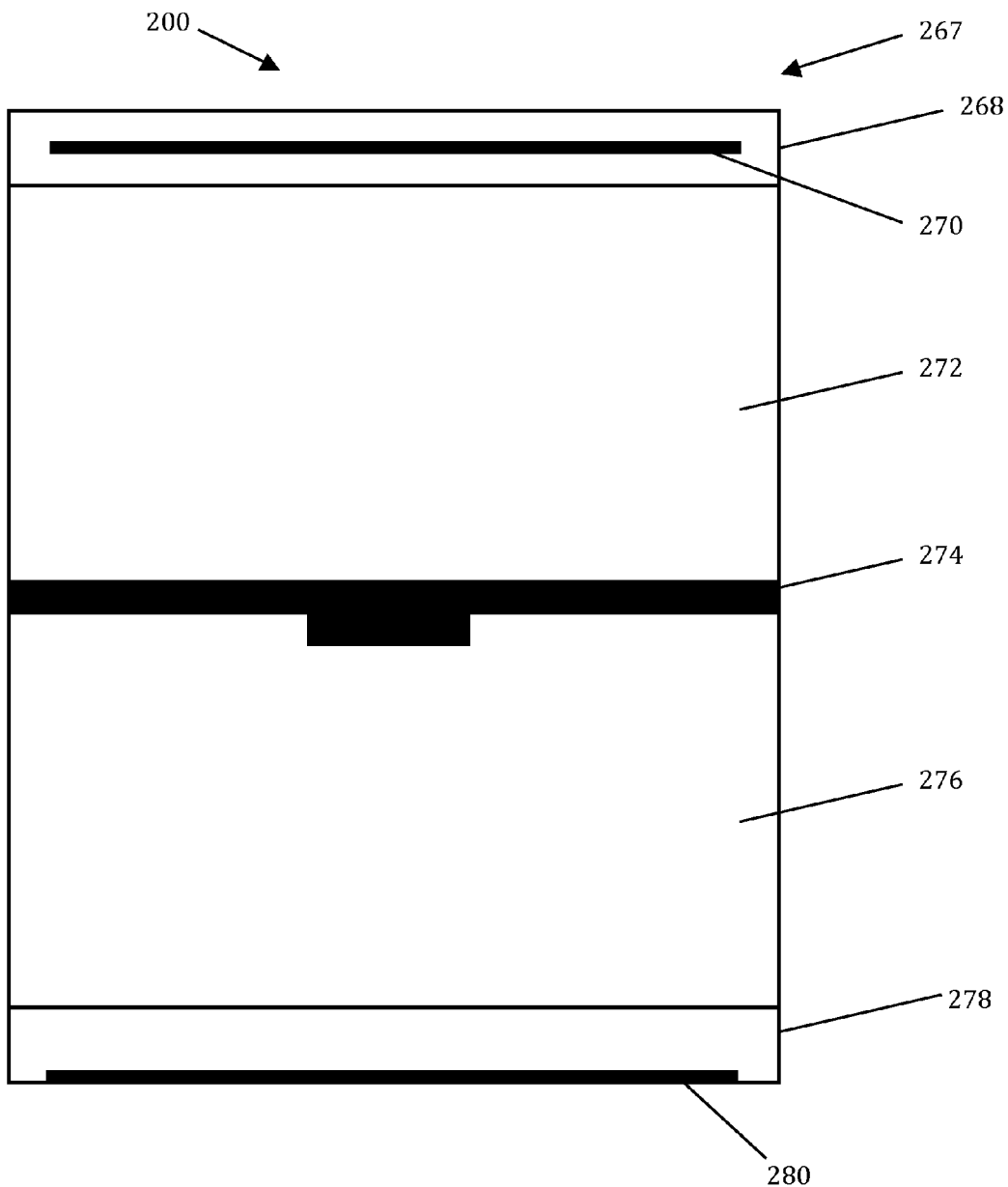
FIG. 5 is an illustration of an exemplary cross-section of an optical media disc having a graphene layer encapsulated within a matrix.

FIG. 5 is an illustration of an exemplary cross-section 267 of an optical media disc 200 having a graphene layer 270 encapsulated within a matrix 268. Graphene layer 280 is shown embedded within layer 278. Layers 268 and 278 show different configurations for securing graphene sheets 100 to disc 200. Layer 268 may be formed according to processes 1000, 2000, 3000, or 6000 shown in FIGS. 9, 10, 11 and 15 respectively. Layer 278 may be formed by processes 5000 or 6000 shown in FIGS. 13, 14 and 15. Graphene layer 280 is near a bottom surface of layer 278. Graphene layer 278 may be partially exposed to the external environment of layer 278. Alternatively, the entire bottom surface of graphene sheet 280 within layer 278 may be exposed to the external environment. In addition, graphene layer 278, may be encapsulated within layer 278, such that it is encased by layer 278 as if it were in a capsule. When encapsulated within matrix layer 278, none of the graphene sheet 280 is exposed to the external environment, as it is with respect to graphene layer 270 in layer 268. Cross-section 268 shows a single recording layer 274 of a single-sided, single-layer disc 200. Substrate 272 is positioned between matrix layer 268 and recording layer 274.

Transparent cover layer 276 is positioned between matrix layer 278 and recording layer 274. Matrix layer 268 is optional. Matrix layers 268 and 278 may be formed of a fluid adhesive that is spin coated onto the disc 200. Matrix layers 268 and 278 may be formed of any material that is capable of receiving a sheet of graphene when in a non-solid state, which can then be cured into a solid state, thereby encapsulating the graphene sheet. While in a non-solid state, one or more graphene sheets 270 or 280 may be placed within matrix layers 268 and 278. In this example, a single graphene sheet 270 is shown in layer 268. Similarly, a single graphene sheet 280 is shown in matrix layer 278. Once graphene sheets 270 and 280 are placed within matrix layers 268 and 278, those layers 268 and 278 are cured into a solid state. Alternative materials for matrix layers 268 and 278 include a polymer, glass, resin, a hard-coating material, or any other material that can encapsulate a sheet of graphene.

Cross-section 268 illustrates a configuration that includes dual matrix layers 268 and 278 without having any hard-coating layer as shown in FIGS. 2, 3 and 4. While cross-section 268 illustrates a single-sided single-layer disc 200, cross-section 268 that does not include hard-coating layers may be used in combination with single-sided, dual-layer discs 220 and dual-sided, single-layer discs 244 as shown in FIGS. 3 and 4, respectively. Graphene sheet 280 may be embedded into matrix 278 through process 5000 shown in FIGS. 13 and 14. Alternatively, graphene sheet 280 may be embedded within matrix 278 through a stamping process. When graphene sheet 280 is stamped into matrix 278, matrix 278 is made of a material that is capable of being stamped, such as for example, a polymer or resin.

Note that graphene sheet 268 is encapsulated within matrix 270, which may be in a non-limiting example, an adhesive, a polymer, or a glass, or some other material. Thus, by being encapsulated within matrix 270, graphene sheet 268 is completed surrounded or encased by matrix 270. Similarly, graphene sheet 280 may be encapsulated within matrix 278. Although in this figure graphene sheet 280 is shown as being embedded within matrix 278 such that a bottom surface of graphene sheet 280 is exposed to the exterior environment.

Figure 6:
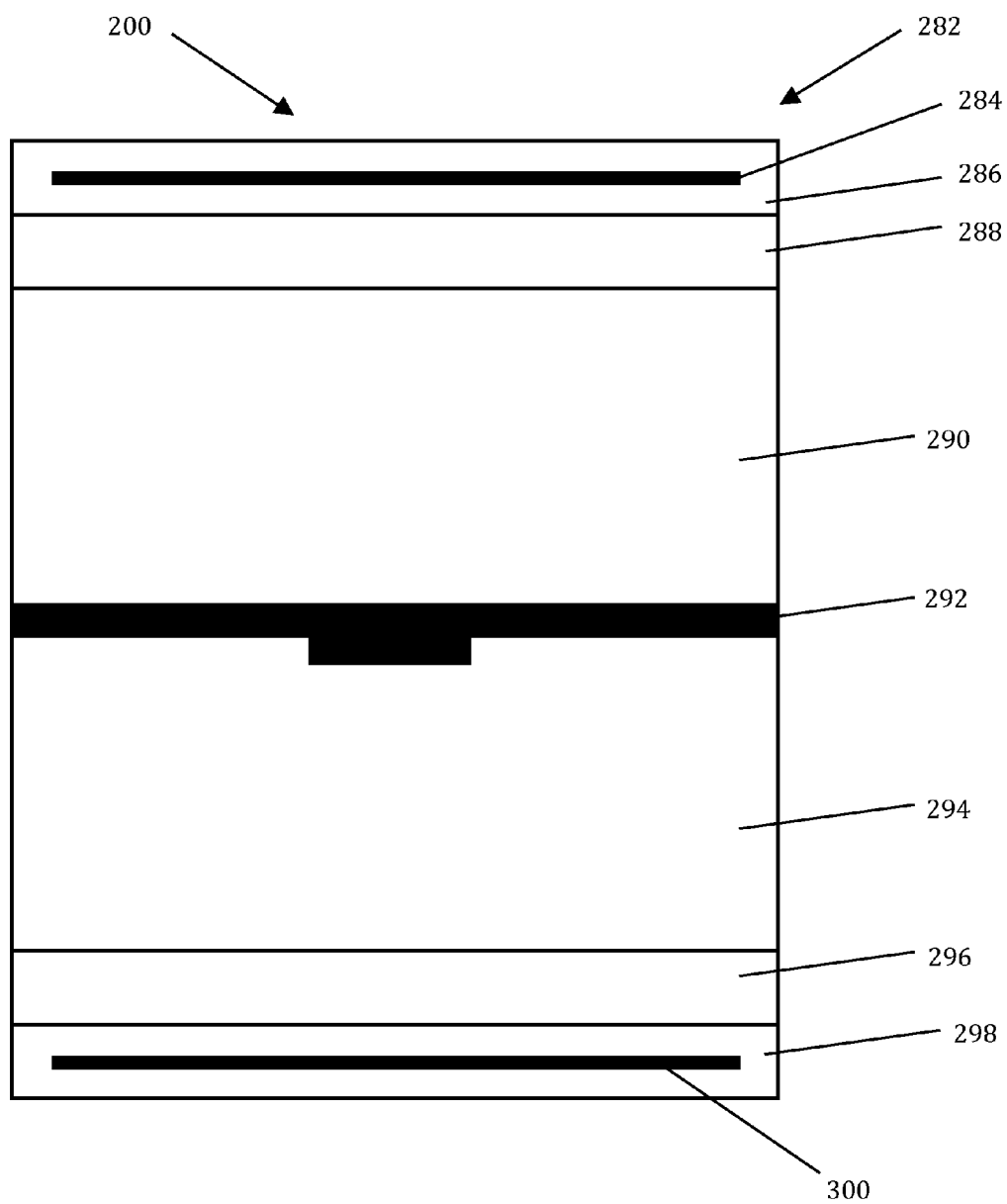
FIG. 6 is an illustration of an exemplary cross-section of an optical media disc having graphene layers encapsulated within separate matrices, layers of hard-coat, and a recording layer.

FIG. 6 is an illustration of an exemplary cross-section 282 of an optical media disc 200 having dual graphene layers 284 and 300 separately encapsulated within matrices 286 and 298 respectively, layers of hard-coat 288 and 296 and optical recording layer 292. In this configuration, hard-coat layer 288 and matrix layer 286 are optional as substrate 290 typically provides protection for the top of recording layer 292. Transparent cover layer 294 is between recording layer 292 and hard-coating layer 296. In this configuration, matrix layer 300 is the first barrier for wear protection. Hard-coating layer 296 provides additional wear protection. As discussed above, matrix layers 286 and 298 may be formed from a spin-coated adhesive, polymer, resin or glass, for example. Cross-section 282, while shown with a single-sided single layer medium 200, may be used in combination with single-sided dual-layer discs 220 and dual-sided single-layer discs 244 as shown in FIGS. 3 and 4.

Figure 7:
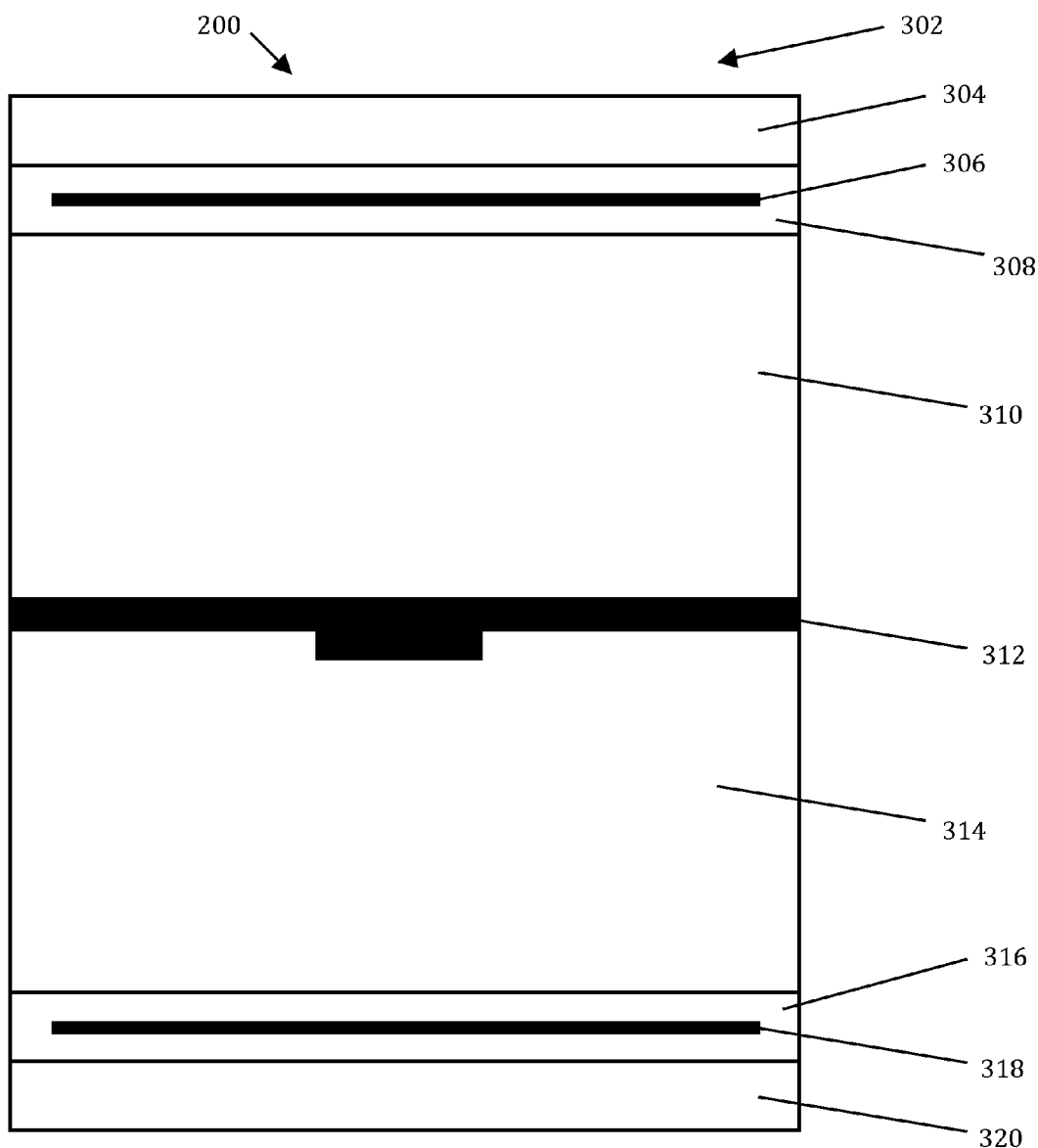
FIG. 7 is an illustration of an exemplary cross-section of an optical media disc having hard-coat layers, graphene layers, and a recording layer.

FIG. 7 is an illustration of an exemplary cross-section 302 of an optical media disc 200 having hard-coat layers 304, matrix layers 308 and 316 that each contain one or more sheets of graphene 306 and 318, and a recording layer 312. Cross-section 302, while shown with a single-sided single layer medium 200, may be used in combination with single-sided dual-layer discs 220 and dual-sided single-layer discs 244 as shown in FIGS. 3 and 4. In this configuration, hard-coat layer 304 and matrix layer 308 are optional, as typically substrate 310 functions as the wear protection for recording layer 312. Transparent cover layer 314 is between recording layer 312 and matrix 316. Together matrix layer 316 containing graphene sheet 318 and hard-coating layer 320 function to provide wear protection to the bottom portion of recording layer 312. Also, hard-coating layer 304 together with matrix layer 308 and graphene sheet 306 function to provide wear protection to the top of recording layer 312.

Figure 8:
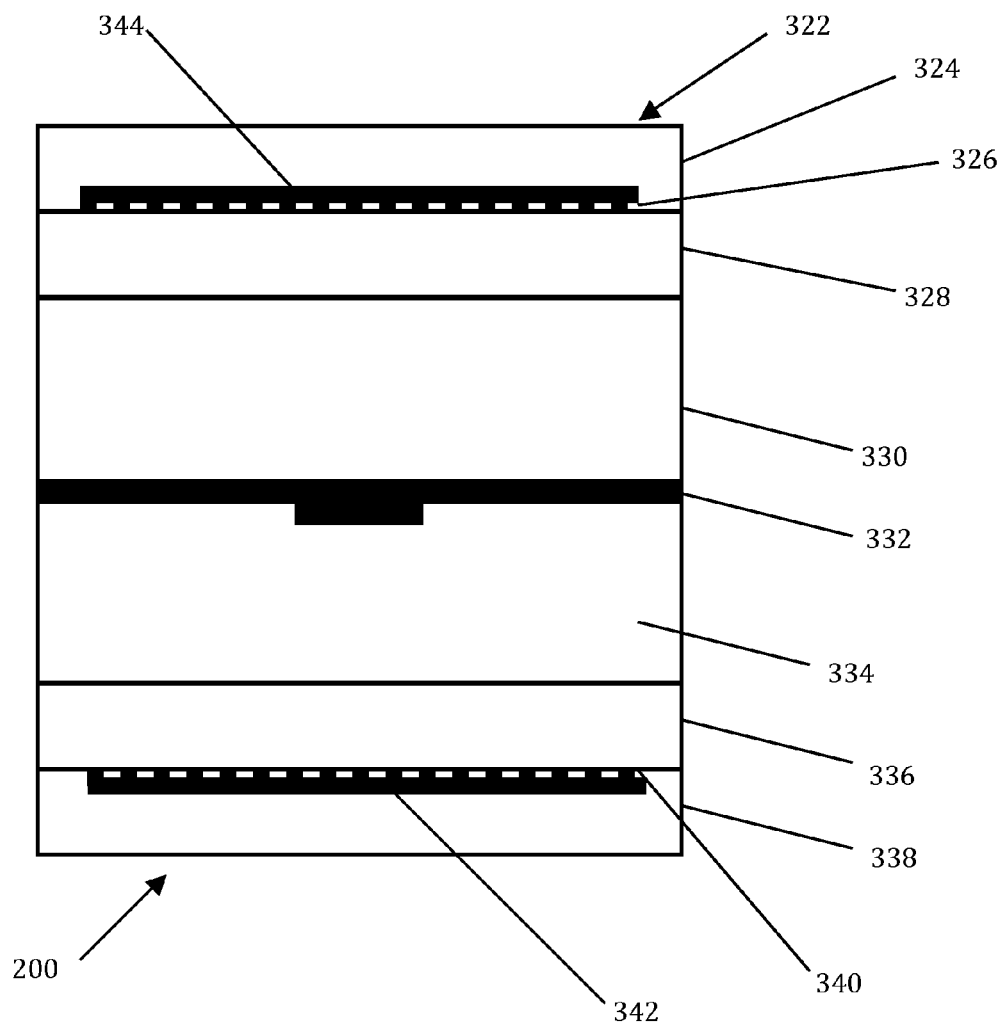
FIG. 8 is an illustration of an exemplary cross-section of an optical media disc having a graphene layer encapsulated between a matrix layer, and a hard-coat layer.

FIG. 8 is an illustration of an exemplary cross-section 322 of an optical media disc 200 having graphene layers 342 and 344 that are separately encapsulated between hard-coat layers 324 and 338 and matrix layers 328 and 336. Substrate 330 is between recording layer 332 and matrix layer 328. Transparent cover layer 334 is between recording layer 332 and matrix layer 336. Matrix layers 328 and 336 are layers of the disc, and may be referred to as disc layers. Graphene sheets 342 and 344 may be attached to matrix layers 328 and 336 with adhesive layers 326 and 340, shown by dashed lines, respectively. Alternatively, layers 326 and 340 may each be a nucleation layer that is deposited on matrix layers 328 and 336 respectively. Graphene layers 342 and 344 may then be grown or deposited on the nucleation layers 326 and 340. One exemplary method of graphene sheet growth is through introduction of a graphene gaseous precursor that is then annealed. The residual precursor gaseous components are then removed and the disc 200 is cooled. Cross-section 332, while shown with a single-sided single layer medium, 200 may be used in combination with single-sided dual-layer discs 220 and dual-sided single-layer discs 244 as shown in FIGS. 3 and 4.

Figure 9:
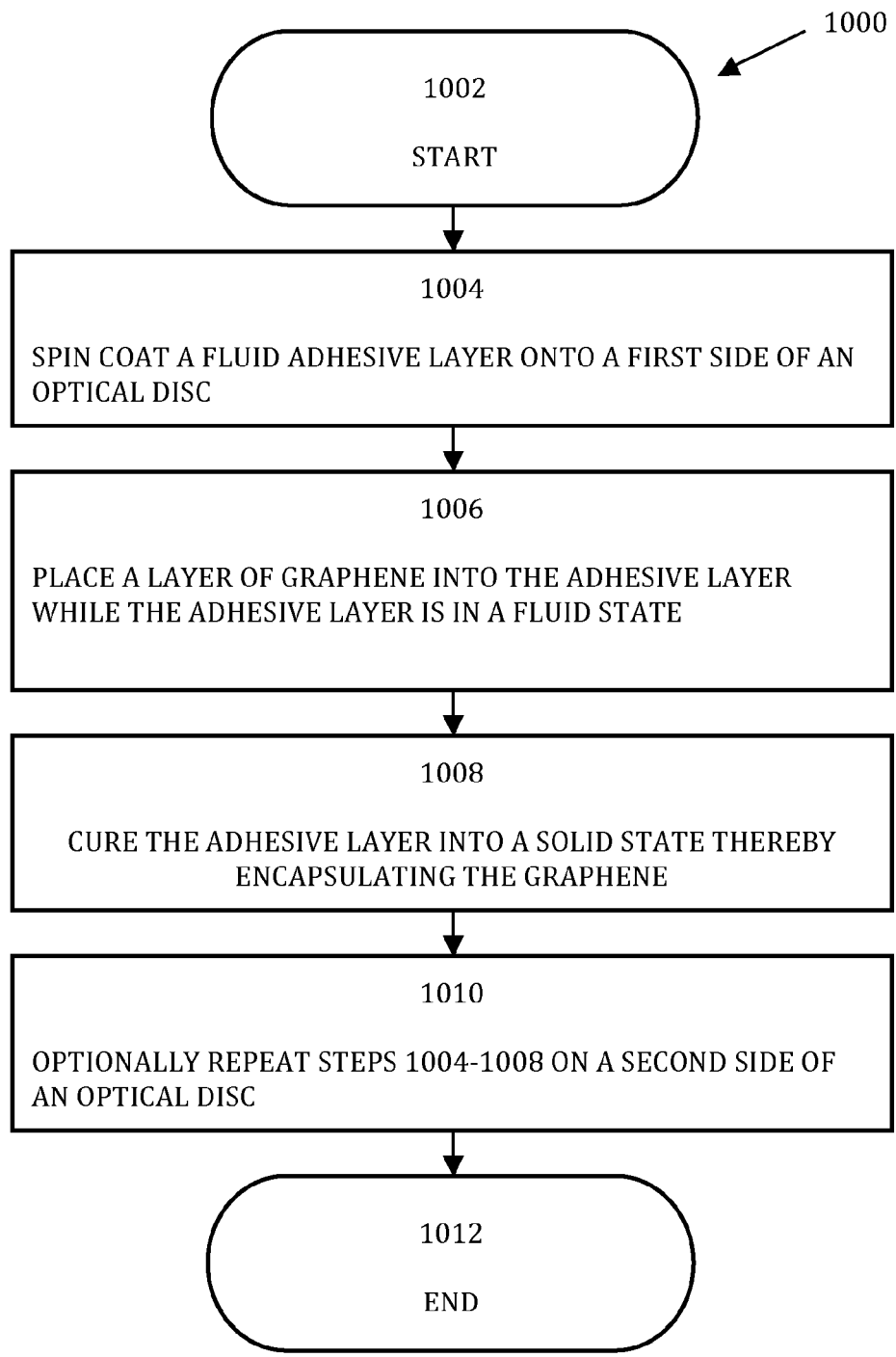
FIG. 9 depicts a flow chart of an exemplary method for applying a layer of graphene to an optical disc through spin coating an adhesive layer onto the disc.

FIG. 9 depicts a flow chart 1000 of an exemplary method for applying a layer of graphene 100 to an optical disc 200 through spin coating an adhesive layer, such as for example, layer 298, onto disc 200. The method starts with step 1002. In step 1004, a fluid adhesive is spin-coated onto a first side of an optical disc 200, thereby forming an adhesive layer 298. While the adhesive layer 298 is in a fluid state, a sheet of graphene, such as for example, sheet 300, is placed into adhesive layer 298 in step 1006. In step 1008, adhesive layer 298 is cured into a solid state, thereby encapsulating graphene sheet 300 within adhesive layer 298. In step 1010, steps 1004-1008 may be repeated on the other side of optical disc 200 if it is desired to have an adhesive layer 286 containing a sheet of graphene 284. The process then ends in step 1012.

Figure 10:
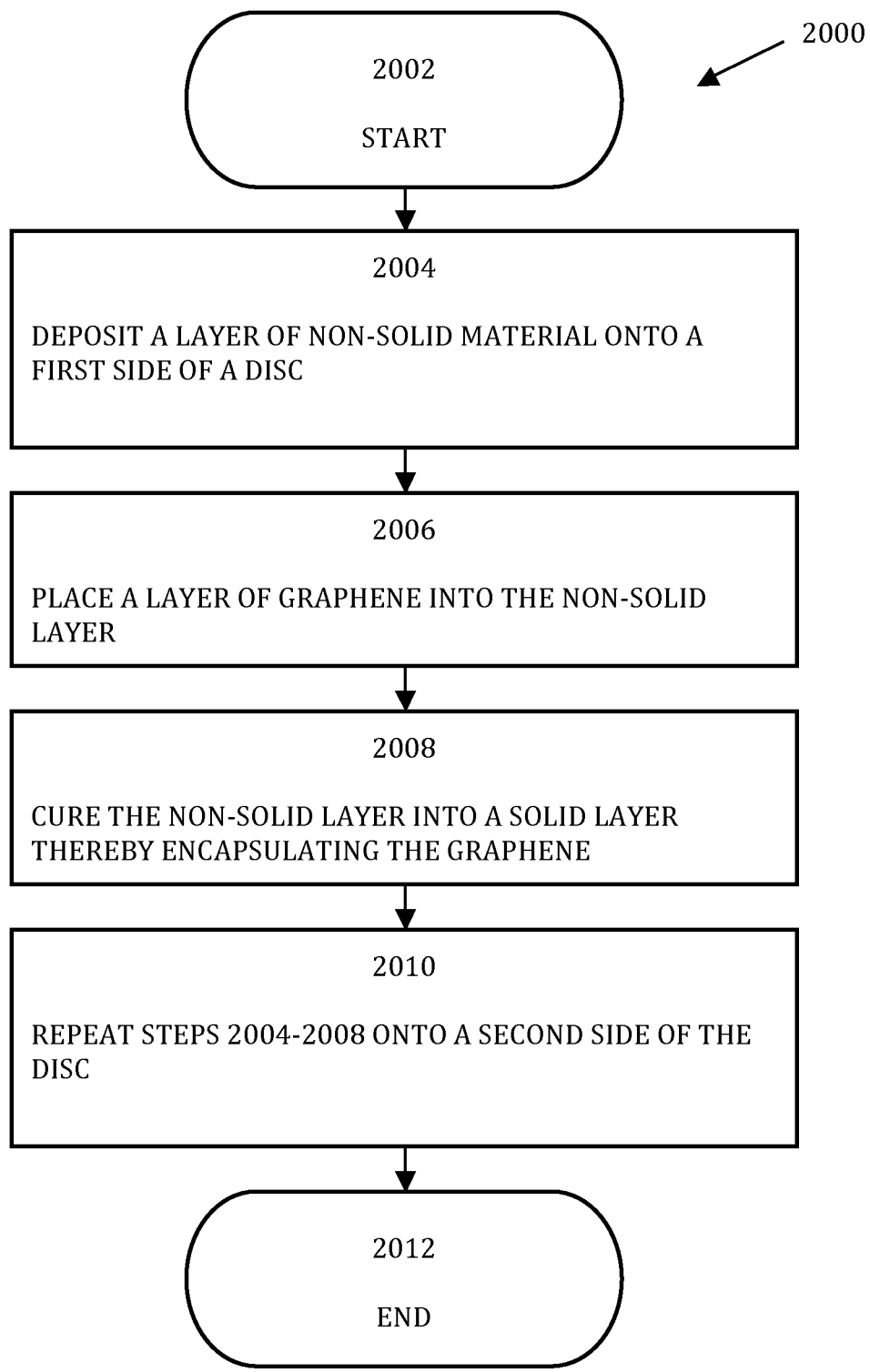
FIG. 10 depicts a flow chart of an exemplary method for applying a layer of graphene to an optical disc through spin coating a hard-coat layer onto the disc.

FIG. 10 depicts a flow chart 2000 of an exemplary method for applying a layer of graphene 100 to an optical disc 200 through depositing a matrix layer onto the disc 200. The matrix layer, such as, for example, layer 268, may be formed of a material such as a polymer, glass, resin, or other matrix material capable of encapsulating a layer of graphene. The process begins with step 2002. In step 2002, a matrix material is deposited onto disc 200 in a non-solid state, such as, for example, a fluid. While matrix layer 268 is in this non-solid state, a sheet or layer of graphene, such as, for example, sheet 270, is placed into matrix layer 268 in step 2006. Then in step 2008, the non-solid matrix layer is cured into a solid state, thereby encapsulating the graphene sheet within the matrix layer. In step 2010, steps 2004-2008 may be repeated to form a second matrix layer, such as for example, layer 278, containing graphene sheet 280. The process ends with step 2012.

Figure 11:
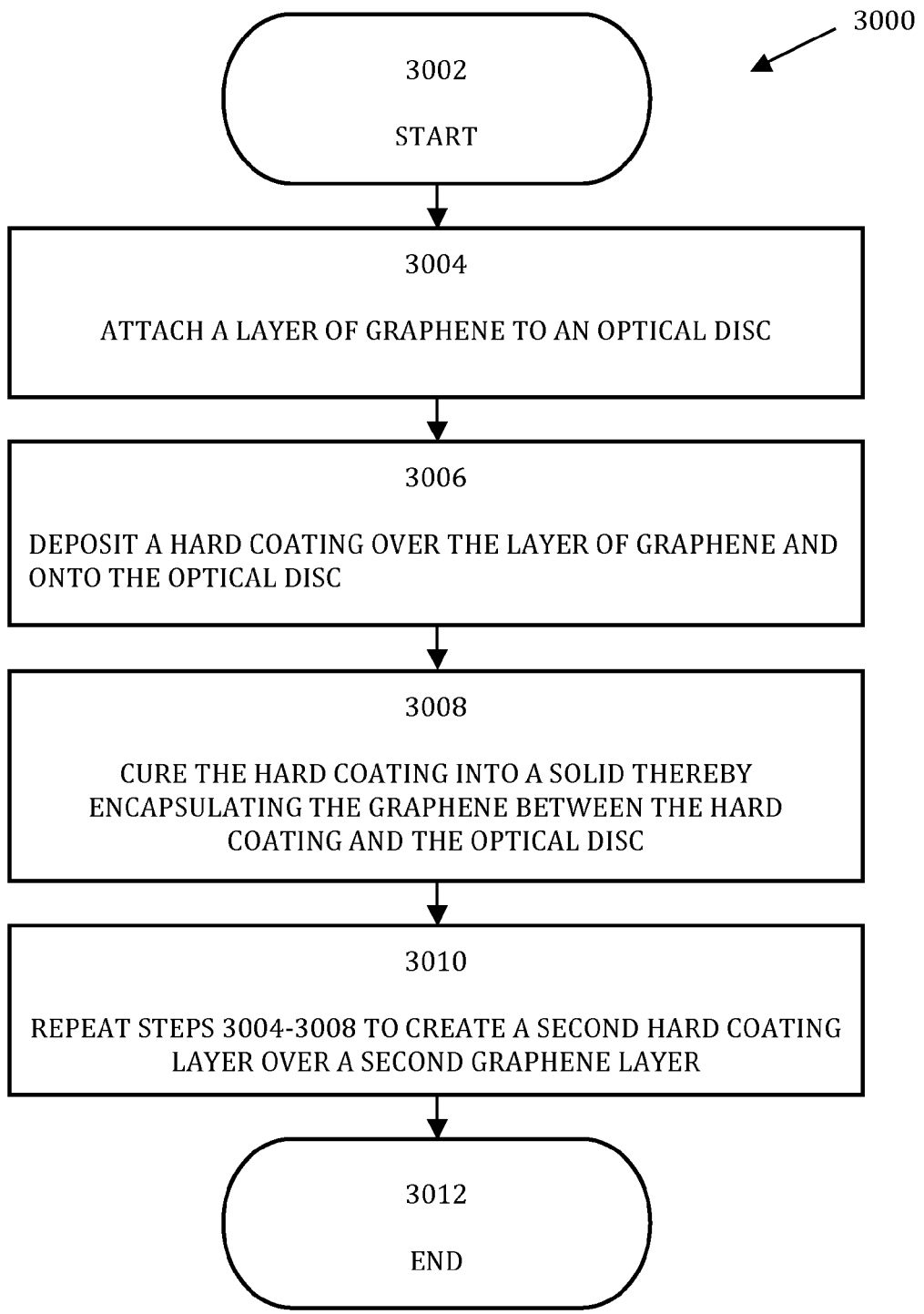
FIG. 11 depicts a flow chart for applying a layer of graphene to an optical disc through attaching the layer of graphene to the optical disc and applying a hard-coat layer over the graphene layer onto the disc.

FIG. 11 depicts a flow chart 3000 for applying a layer of graphene 342 to an optical disc 200 through attaching the layer of graphene 342 to the optical disc 200 and applying a hard-coat layer 338 over the graphene layer 342 onto the disc 200. The process begins with step 3002. In step 3004, a layer of graphene 342 is attached to disc 200 with an adhesive layer 340. A layer of hard-coating 338 is then deposited over graphene layer 342 in step 3006. As such, hard-coating layer 338 and disc layer 336 thereby encapsulate graphene layer 342. In step 3008, hard-coating layer 338 is then cured into a solid. In step 3010, steps 3004-3008 may be repeated to create graphene layer 344, adhered to disc 200 with adhesive layer 326, which is then encapsulated with hard-coat layer 324. The process then ends with step 3012.

Figure 12:
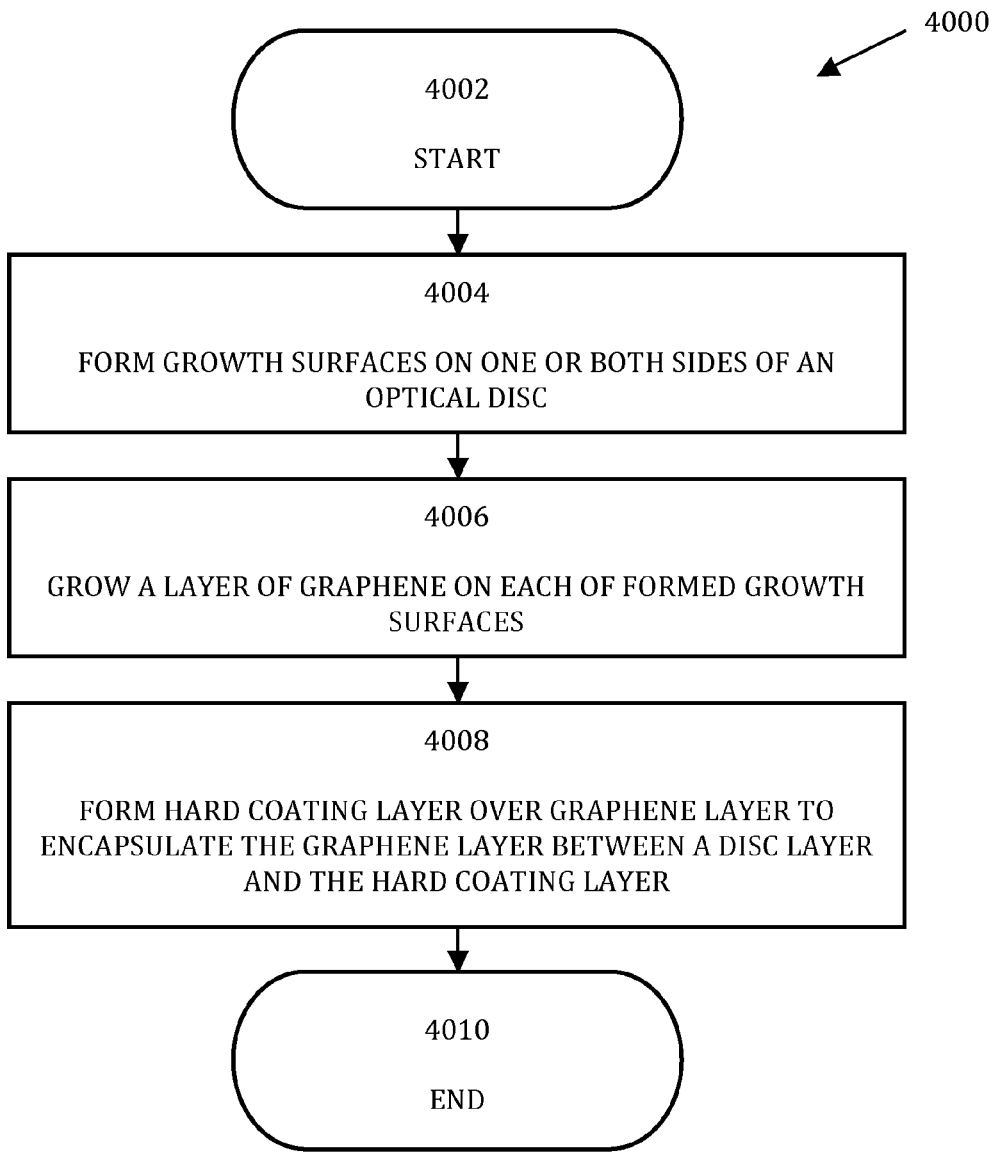
FIG. 12 depicts a flow diagram for depositing a layer of graphene onto an optical disc.

FIG. 12 depicts a flow diagram 4000 for depositing a layer of graphene 342 onto an optical disc 200. The process begins with step 4002. In step 4004, a growth surface 340 and/or 326 is created on one or both sides of disc 200 through nucleation for example. Growth surfaces 340 and 326 function as a seed layer for growing graphene layers 342 and 344. Once surfaces 340 and/or 326 are created, in step 4006, layers of graphene 342 and/or 344 are grown on growth layers 340 and/or 326. In step 4008, hard-coating 338 and/or 324 may then be optionally deposited over graphene layers 342 and 344, thereby encapsulating graphene layer 342 between layers 336 and 338 and encapsulating graphene layer 344 between layers 324 and 328. The process ends with step 4010.

Figure 13:
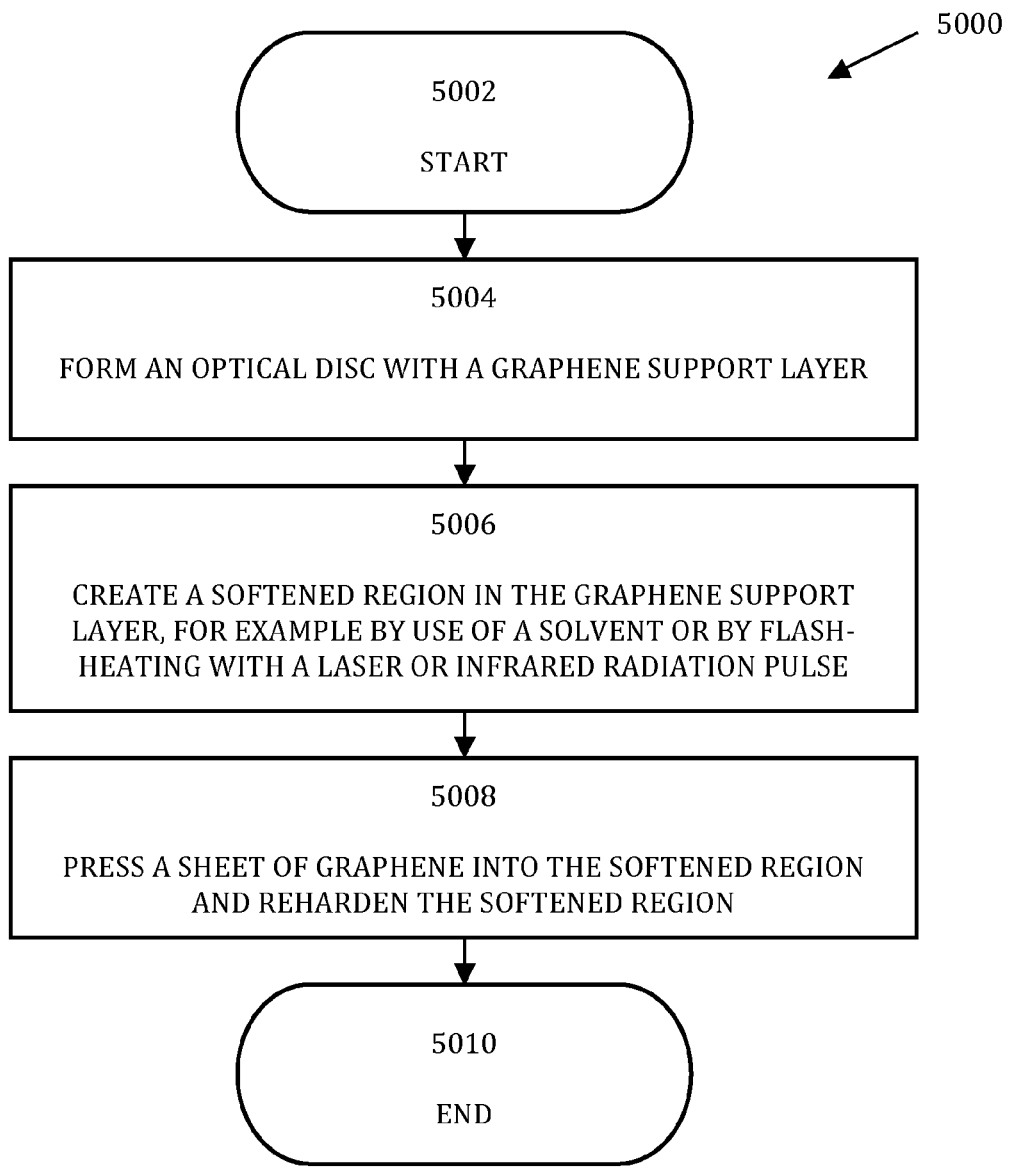
FIG. 13 depicts a flow chart for embedding a graphene sheet into a softened layer of a disc.
Figure 14:
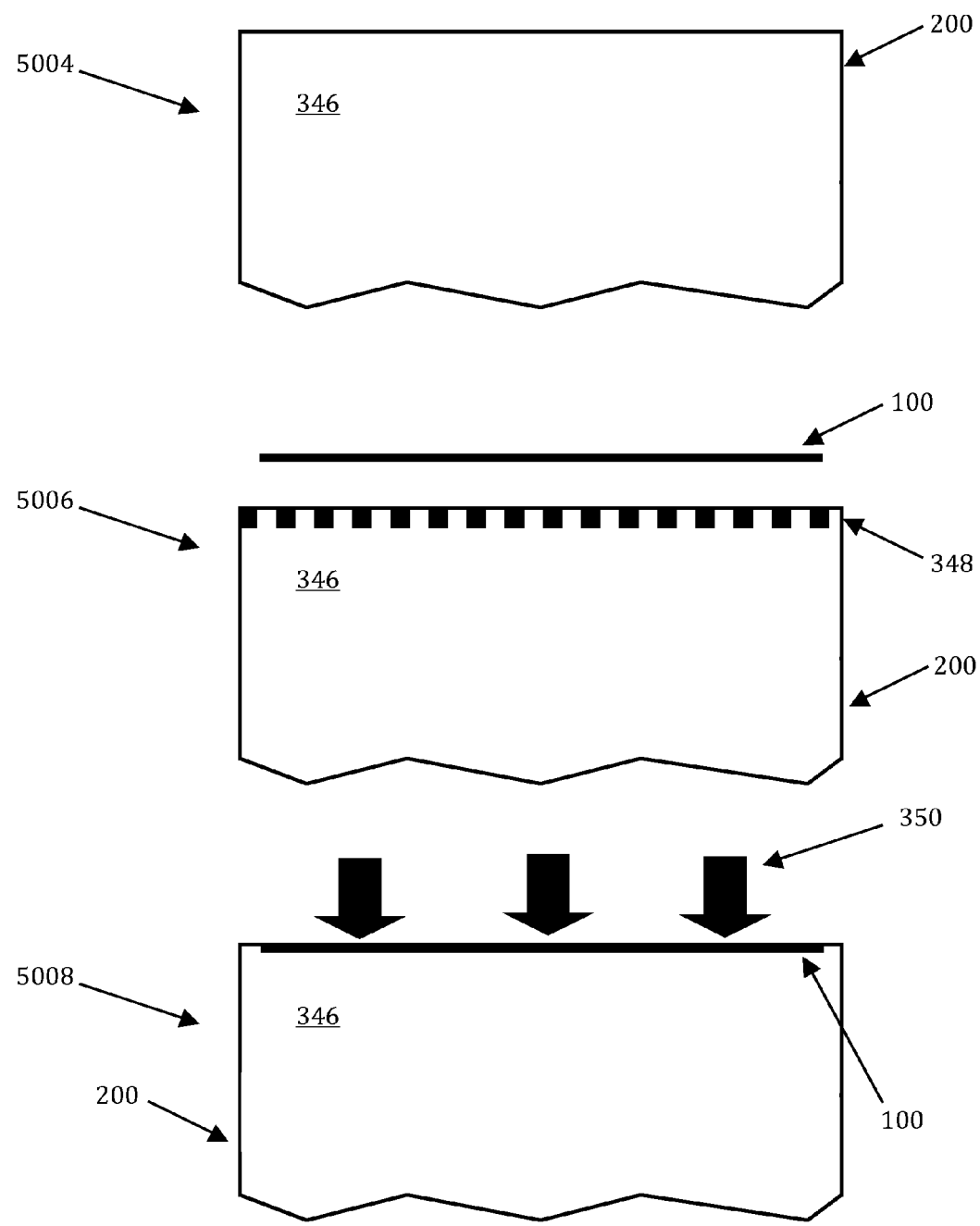
FIG. 14 illustrates a flow diagram for embedding a graphene sheet into a softened layer of a disc.

FIG. 13 depicts a flow chart 5000 for embedding a graphene sheet 100 into a softened layer of a disc 200. FIG. 14 illustrates a flow diagram for embedding a graphene sheet 100 into a softened layer 348 of a disc 200. The process begins with START in step 5002. In step 5004, an optical disc 200 is formed having a graphene support layer 346. Graphene support layer 346 is a layer that forms an exterior surface of optical disc 200, such as layer 278 and/or 268 shown in FIG. 5. In step 5006, a softened region 348 is created in the graphene support layer 346. Graphene support layer 346 may be made of a material that is softened through the use of a solvent, such as, for example, a polymer, resin, or other soluble material. For example, solvents for softening polymers are well known and exist in many varieties. Another method for forming a softened layer 348 within graphene support layer 346 is by forming layer 346 out of a material that may be softened through application of heat, such as through flash-heating with a laser or through an infrared radiation pulse. Materials that are susceptible to softening by heat include, but are not limited to polymers, resins, glass, and other materials. In step 5008, a sheet of graphene 100 is pressed into the softened region 348, depicted with arrows 350, such that it is embedded within graphene support layer 5008. When graphene layer 100 is embedded within graphene layer 346, it may be exposed to the external environment on the bottom side of disc 200. Alternatively, graphene layer 346 may be encapsulated within graphene support layer 346. The process ENDS with step 5010.

Figure 15:
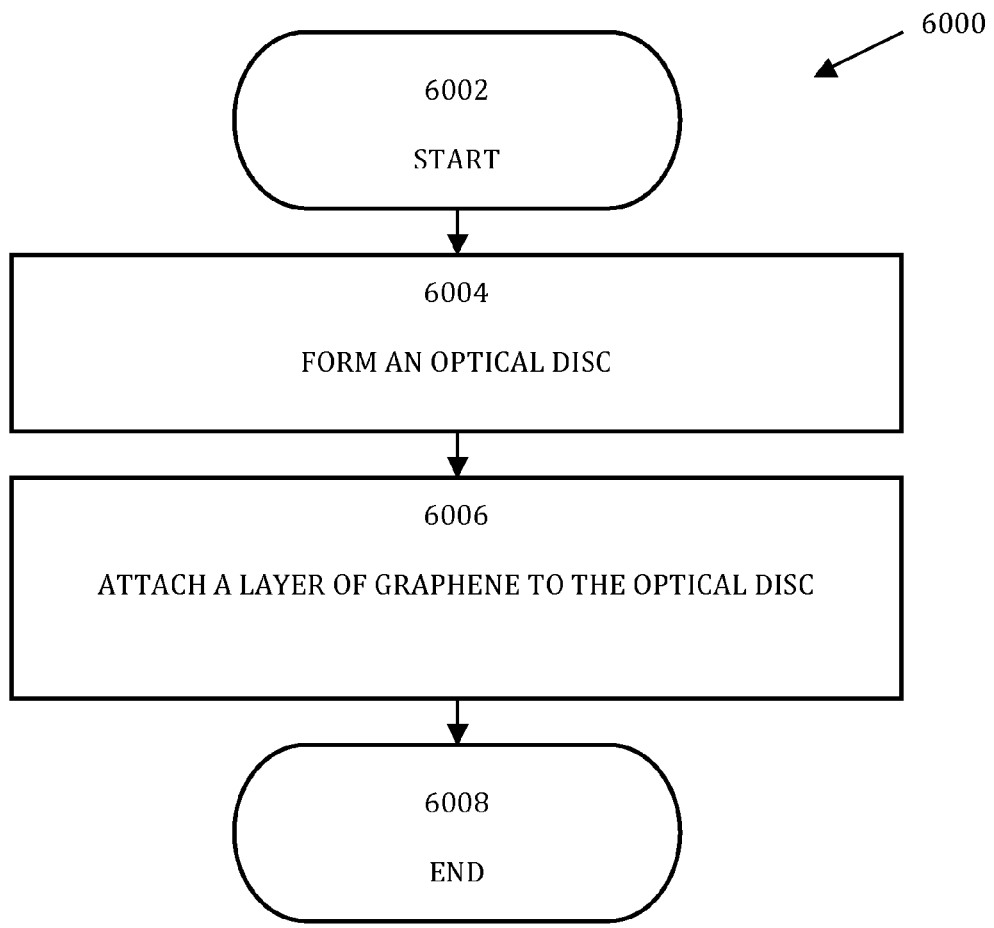
FIG. 15 illustrates a flow chart for attaching a graphene sheet to an optical disc.

FIG. 15 illustrates a flow chart 6000 depicting a process for attaching a sheet of graphene to an optical disc. The process begins with START in step 6002. In step 6004, an optical disc is formed. In step 6006, a layer of graphene is attached to the disc. The layer of graphene may be attached by stamping it into a matrix layer. The graphene layer may be attached by bonding it to an exterior surface of the optical disc with an adhesive. The process completes with END 6008.

Figure 16:
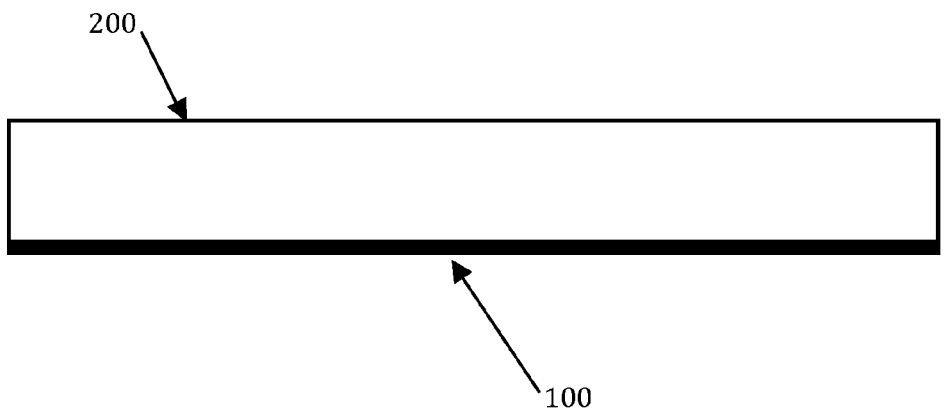
FIG. 16 illustrates an optical disc having a graphene sheet covering its entire bottom surface.

FIG. 16 illustrates an optical disc 200 having a layer of graphene 100 covering the entire bottom surface of disc 200. Graphene layer 100 may be attached to disc 200 by means of process 4000, 5000, or 6000. Graphene layer 100 has its entire bottom surface exposed to the exterior environment.

Figure 17:
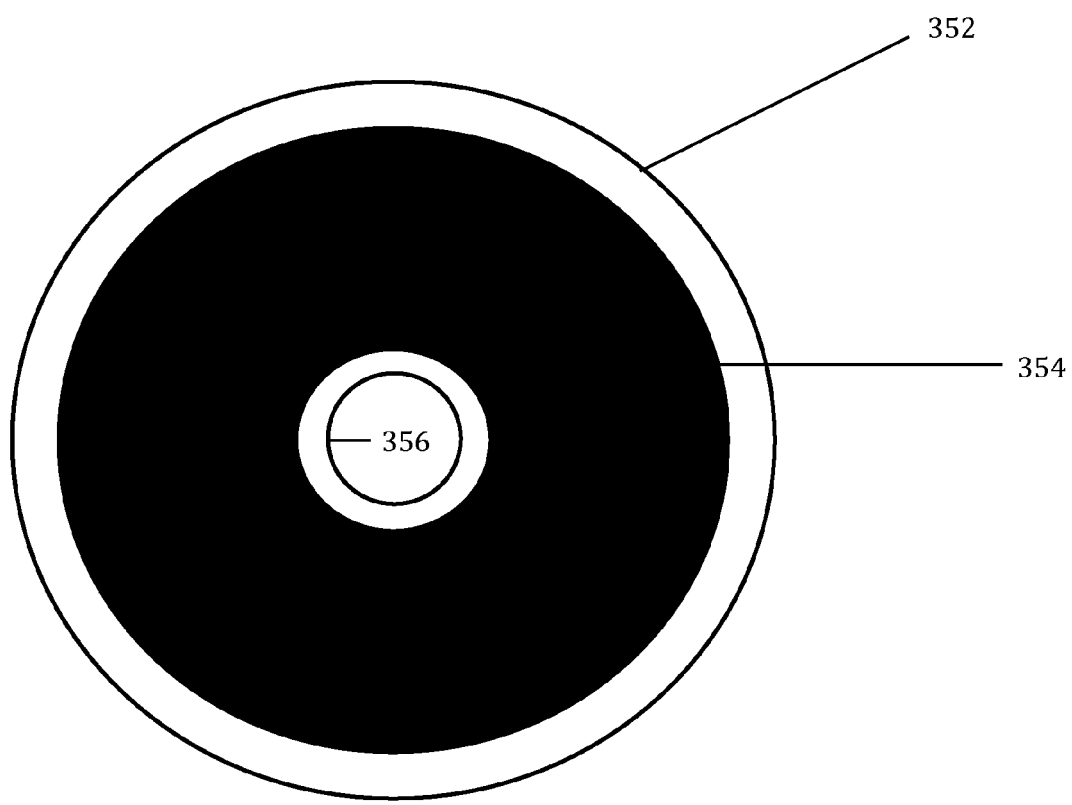
FIG. 17 illustrates a bottom view of an optical disc having a contiguous annular graphene sheet for wear protection.

FIG. 17 illustrates a bottom view of an optical disc 352 having a contiguous annular graphene sheet 354 for wear protection. Disc 352 includes a center hole 356 for connecting to a drive shaft for spinning disc 352. Graphene sheet 354 is formed of a single contiguous lattice of carbon atoms forming graphene in this embodiment. Graphene sheet 354 is placed on disc 352 such that it is parallel to recording layer 358 (shown in FIG. 18). As such, graphene sheet 354 has a uniform orientation with respect to recording layer 358 and any optical read/write head (not shown). Graphene sheet 354 has a uniform thickness, such as being a monolayer of carbon atoms. As such, graphene sheet 354 has a uniform configuration. Graphene sheet 354 may have multiple layers of carbon atoms. It is preferable that graphene sheet 354 be contiguous and of uniform thickness such that there is uniform transmission of light through all of the wear protection layer of disc 352 to facilitate uniform writing to disc 352 and reading from disc 352. If graphene sheet 354 were not contiguous and of a uniform thickness, parts of disc 352 would have different transmission coefficients and hence non-uniform writing of data to disc 352. Thicker portions of graphene would absorb more light than thinner portions of graphene, impacting the functionality of a laser for reading and writing operations. Further, undesirable scattering of light within the wear protection layer could also arise if graphene sheet 354 were not contiguous and of uniform thickness. If graphene sheet 354 had a thickness that varied, light would scatter differently within the wear protection layer, thereby reducing the read/write functionality of the disc 352 and the density of data that disc 352 could hold. This variable scattering of light occurs in composite coatings that include graphene particulates, as opposed to an annular sheet of graphene 354 that is comprised of a contiguous lattice of carbon atoms. An annular sheet of graphene is a single contiguous honeycomb lattice of carbon atoms that is configured in the shape of an annulus to protect the annular recording layer 358 of disc 352. In addition, if graphene sheet 354 were not contiguous, such that in portions of disc 352 had the laser passing to a recording layer through a graphene layer, and other portions of disc 352 had the laser passing to a recording layer through gaps in the graphene layer that are filed with just resin, plastic, or some other binder material only, the read/write functionality of the disc 352 and the density of data that disc 352 could hold would be reduced. The read/write functionality of disc 352 and data density capacity of disc 352 is maximized when graphene sheet 354 is contiguous, has a uniform thickness, has a uniform configuration and uniform orientation with respect to recording layer 358.

Figure 18:
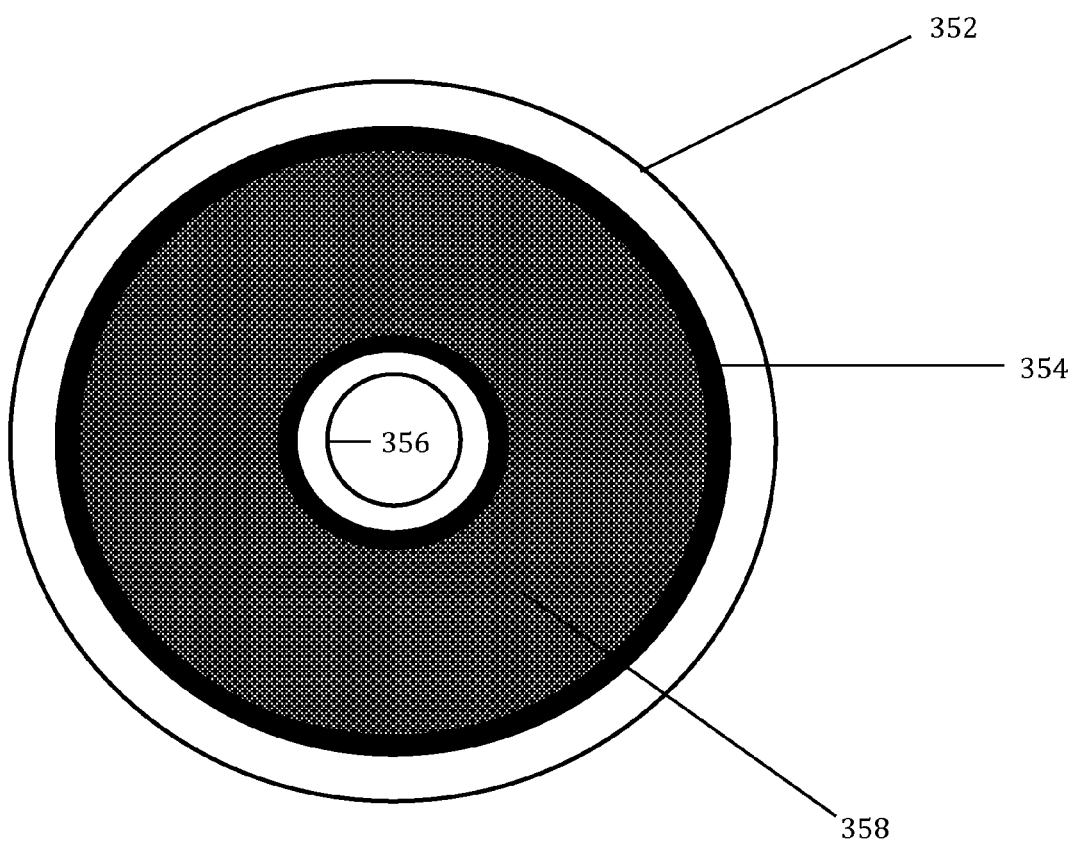
FIG. 18 illustrates a top view of an optical disc having a contiguous annular graphene sheet for wear protection and a recording layer.

FIG. 18 illustrates a top view of an optical disc 352 having a contiguous annular graphene sheet 354 for wear protection and a recording layer 358. Note that, in this example, graphene sheet 354 has a surface area that is larger than recording layer 358, thereby providing wear protection to all of recording layer 358. As graphene sheet 354 provides wear protection to recording layer 358, it is desirable that graphene sheet 354 at least have the same size as recording layer 358 and be placed in vertical alignment with recording layer 358. As shown in this Figure, the center of annular graphene sheet 354 is located at the center of disc 352.

Figure 19:
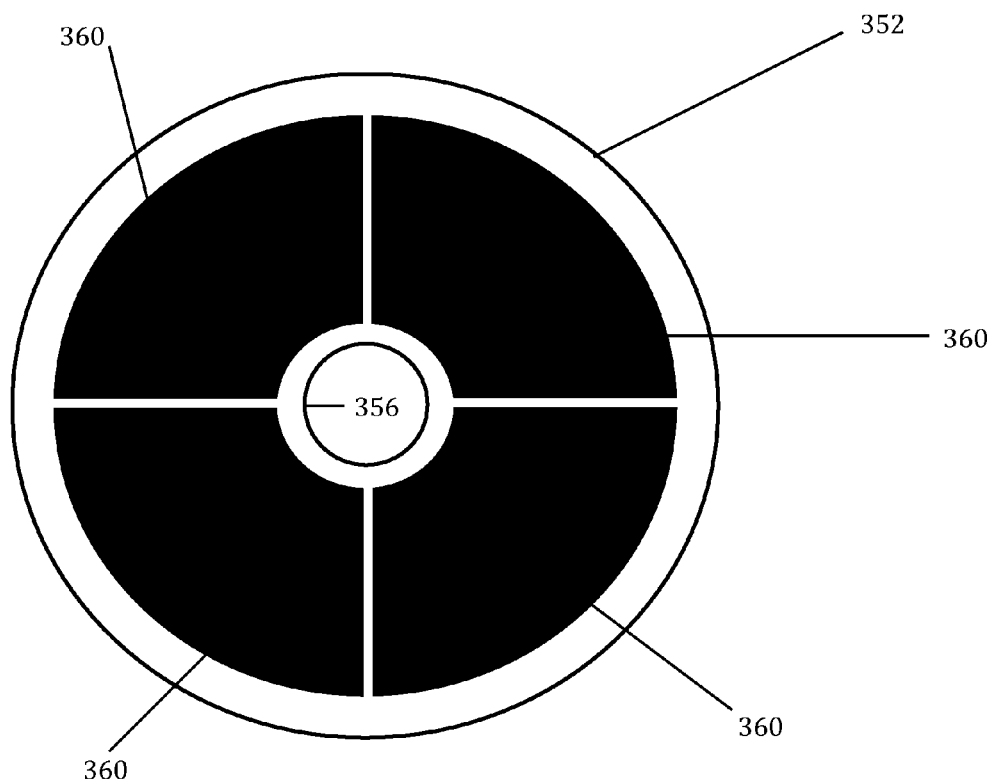
FIG. 19 illustrates a bottom view of an optical disc having a plurality of annular pie-shaped graphene wedges for wear protection.

FIG. 19 illustrates a bottom view of an optical disc 352 having a plurality of annular pie-shaped graphene wedges 360 for wear protection. An annular graphene sheet 354 disc may be formed from a plurality of pie-shaped graphene wedges 360. In this example, four pie-shaped graphene wedges are shown. However, annular graphene sheet 354 could be formed from two semi-annular portions. Annular graphene sheet 354 could be formed of three or any number of pie-shaped graphene wedges. As with an annular graphene sheet 354, it is desirable that graphene sheets 360 have a uniform thickness, such as a monolayer of carbon atoms. All of pie-shaped graphene wedges are preferably on the same vertical plane within disc 352. Note that each pie-shaped graphene wedge may be non-overlapping. Alternatively, each pie-shaped graphene wedge may be overlapping. Note that each pie-shaped wedge is oriented parallel to recording layer 358 as shown in FIGS. 19 and 20.

Figure 20:
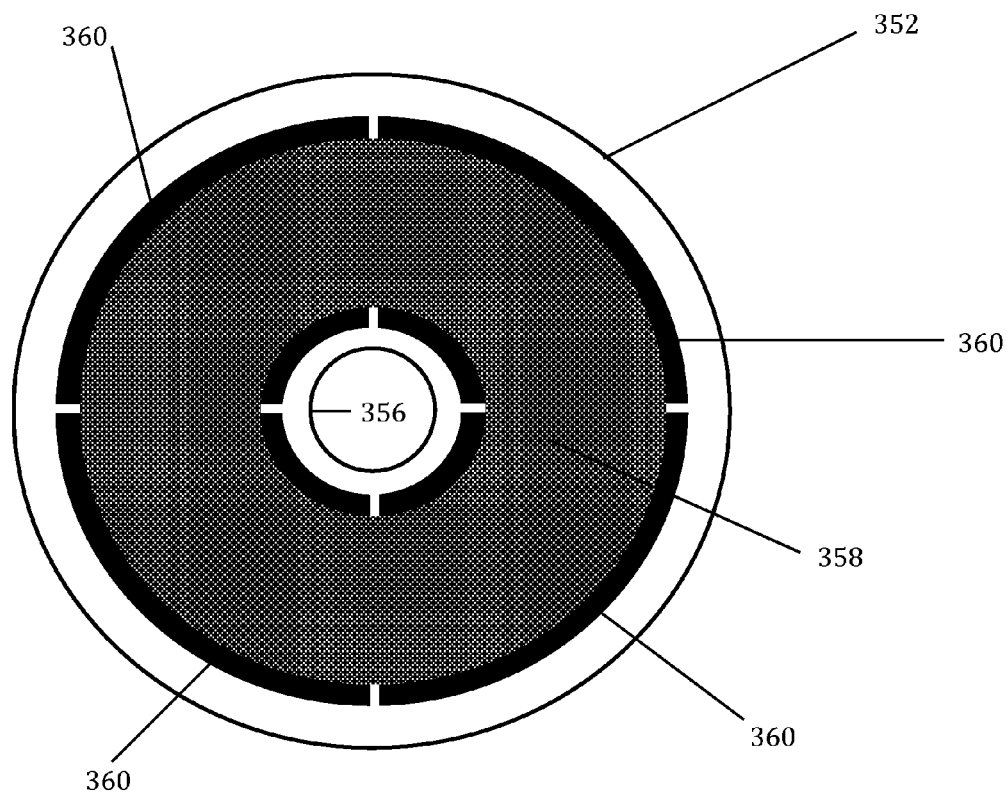
FIG. 20 illustrates a top view of an optical disc having a plurality of annular pie-shaped graphene wedges for wear protection and a recording layer.

FIG. 20 illustrates a top view of an optical disc 352 having a plurality of annular pie-shaped graphene wedges 360 for wear protection and a recording layer 358. In this example, graphene wedges 360 form a larger foot-print than the recording layer 358 in order to provide wear protection to recording layer 358. While shown as being larger, it is desirable that all of the graphene wedges 360 combined have at least the same size as recording layer 358.

Figure 21:
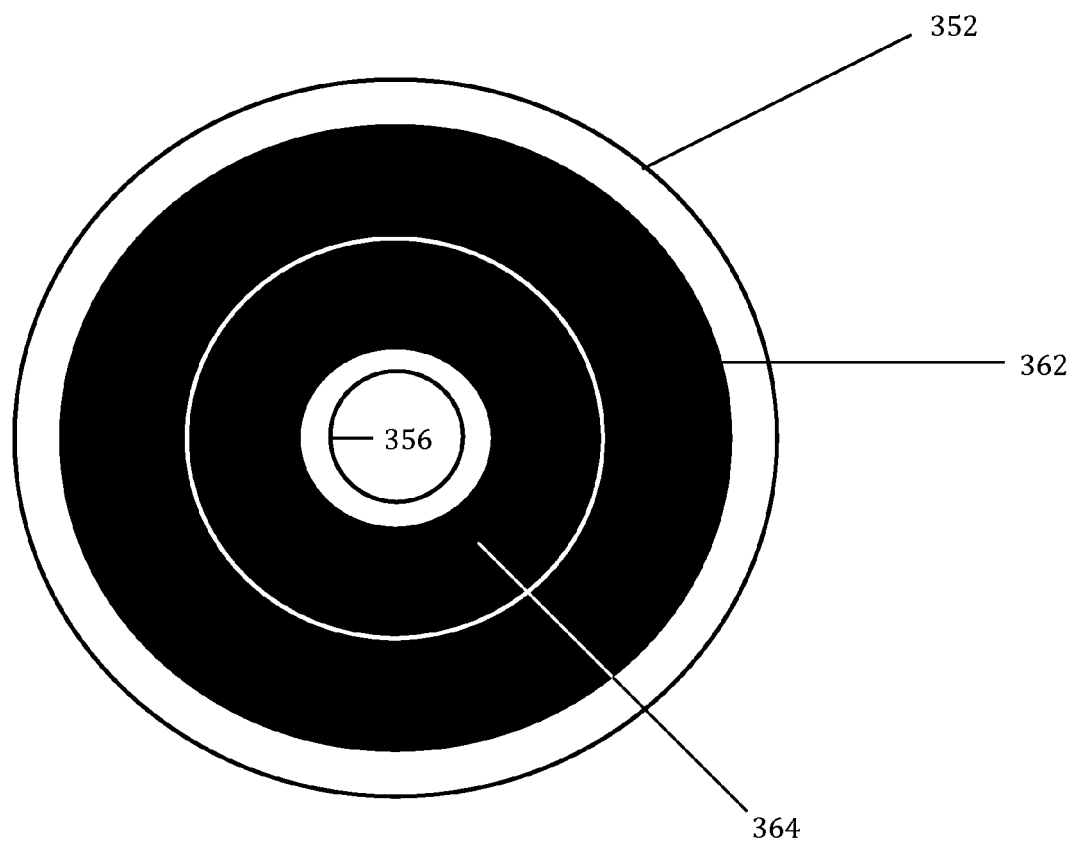
FIG. 21 illustrates a bottom view of an optical disc having a wear protection layer formed from a series of concentric non-overlapping rings.
Figure 22:
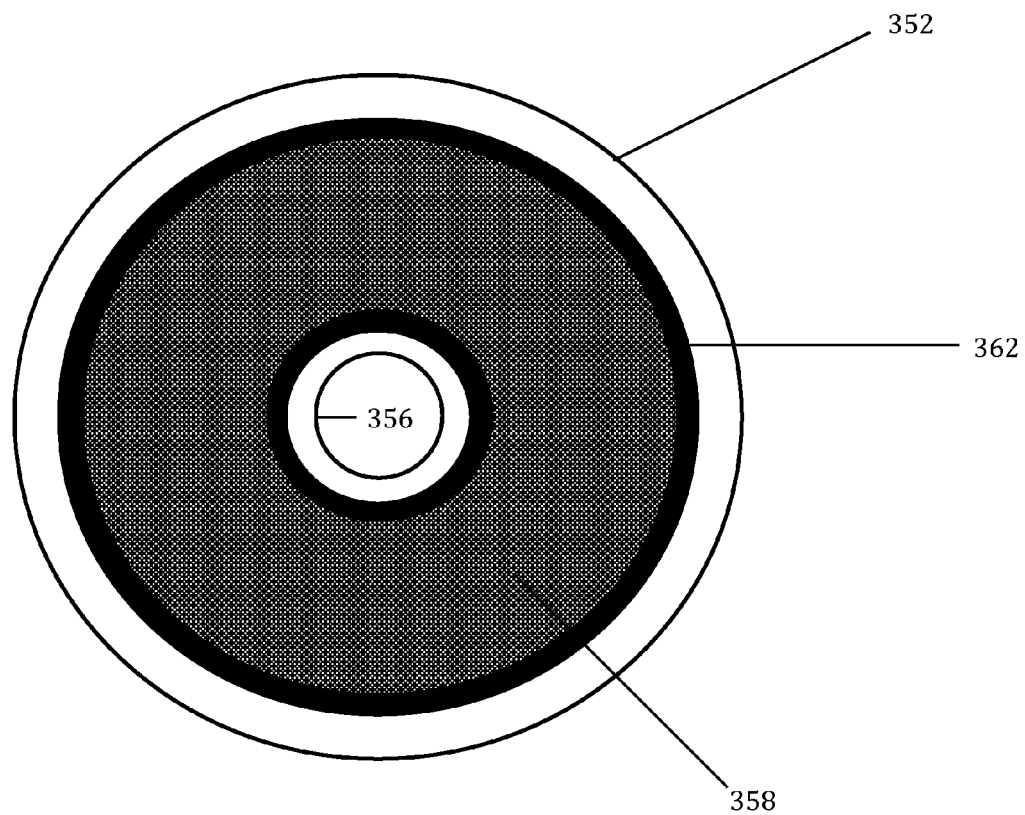
FIG. 22 illustrates a top view of an optical disc having a wear protection layer formed from a series of concentric non-overlapping rings and a recording layer.

FIG. 21 illustrates a bottom view of an optical disc 352 having a wear protection layer formed from a series of concentric non-overlapping rings 362 and 364. An annular graphene sheet 354 may be formed from two or more concentric non-overlapping rings 362 and 364. As with an annular graphene sheet 354, it is desirable that graphene sheets 362 and 364 have a uniform thickness, such as a monolayer of carbon atoms. FIG. 22 illustrates a top view of an optical disc 352 having a wear protection layer formed from a series of concentric non-overlapping rings 362 and 364 (hidden beneath recording layer 358) and a recording layer 358. All of the concentric rings 362 and 364 are preferably on the same vertical plane within disc 352.

Figure 23:
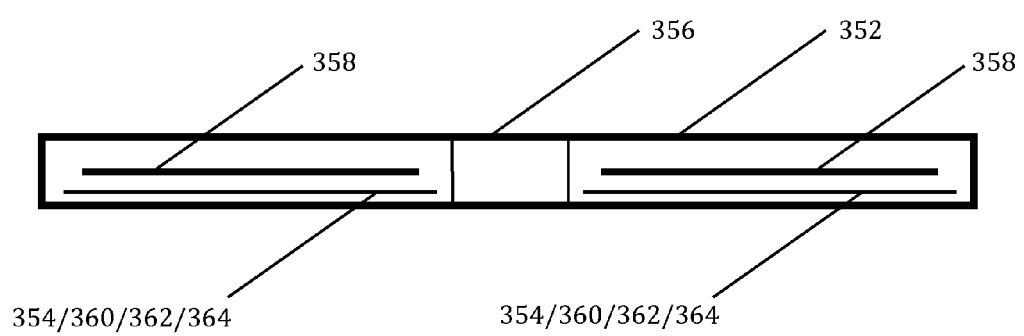
FIG. 23 illustrates a side view of an optical disc having a recording layer and a wear protection layer formed of graphene sheets.

FIG. 23 illustrates a side view of an optical disc 352 having a recording layer 358 and a wear protection layer formed of graphene sheets 354, or 360, or 362 and 364. The center portion 356 is provided for mating with an optical disc drive (not shown). Note that graphene sheets 354, or 360, or 362 and 364 extend beneath then entire portion of recording layer 358 in order to provide wear protection to recording layer 358. In this figure, a single graphene sheet 354, or 360, or 362 and 364 is shown under each recording layer 358. However, it is contemplated that multiple graphene sheets 354, or 360, or 362 and 364 may be placed under each recording layer for enhanced wear protection. In this embodiment, all of the multiple graphene sheets are vertically aligned such that the center of these different annular graphene sheets matches the center of disc 352.

Figure 24:
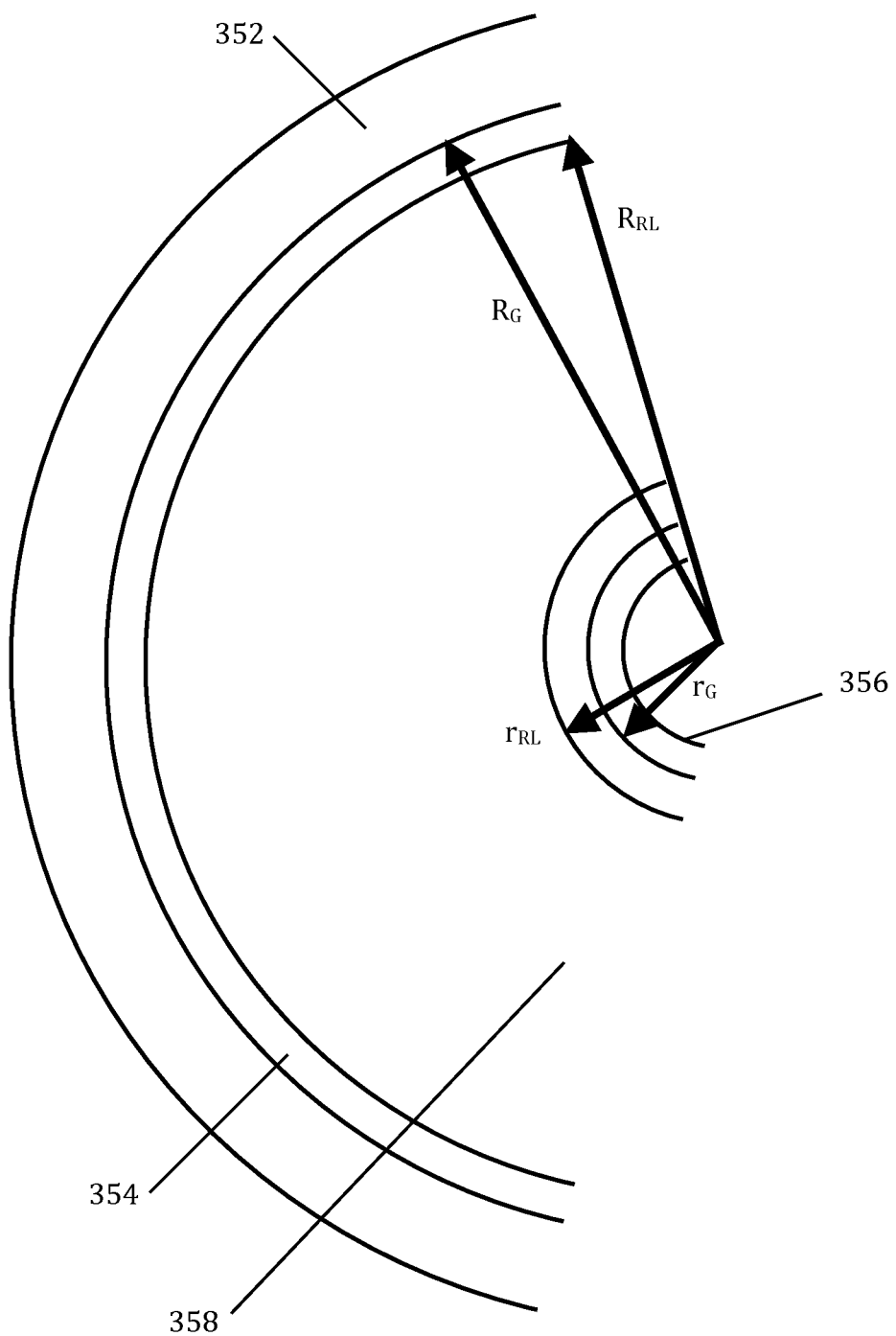
FIG. 24 illustrates a perspective view of an optical disc illustrating the various radial lengths of the disc recording layer, and graphene sheet.

FIG. 24 illustrates a perspective view of an optical disc 352 illustrating the various radial lengths of the disc recording layer 358, and graphene sheet 354. Center portion 356 is configured to mate with an optical disc drive (not shown). Recording layer 358 has an inner radius $r_{RL}$ and an outer radius $R_{RL}$. Graphene sheet 354 has an inner radius $r_G$ and an outer radius $R_G$. The radial lengths of recording layer 358 and graphene sheet 354 are given below be Equations 1 and 2:

$$r_{RL} \geq r_G \qquad \text{EQN 1}$$

$$R_G \geq R_{RL} \qquad \text{EQN 2}$$

The graphene sheet 354 has an area that is at least as large as recording layer 358 in order to provide adequate protection to recording layer 358. Preferably, graphene sheet 354 has a large area than recording layer 358 and extends beyond either edge of recording layer 358, as shown in FIG. 24, in order to provide wear protection to recording layer 358.

While the invention has been shown and described with reference to a particular embodiment thereof, it will be understood to those skilled in the art, that various changes in form and details may be made therein without departing from the spirit and scope of the invention. For example, this invention applies equally to holographic disks as it does for CD, DVD, and BD disks.

I claim:

1. An optical disc, comprising:
   a disc having an optical recording layer; and
   a wear protection layer comprising an annular sheet of graphene encapsulated within a matrix.

2. The optical disc of claim 1, wherein said annular sheet of graphene is formed of a single contiguous sheet of graphene.

3. The optical disc of claim 2, wherein said annular sheet of graphene has a uniform thickness, thereby providing uniform transmission of light through said wear protection layer to facilitate uniform reading and writing of information to and from said optical recording layer.

4. The optical disc of claim 1, wherein said annular sheet of graphene is formed of a single contiguous monolayer of carbon atoms.

5. The optical disc of claim 1, wherein a center of said annular sheet of graphene is located at a center of said optical disc, said annular sheet of graphene has an inner radius that has a length that is less than an inner radius of said optical recording layer, and said annular sheet of graphene has an outer radius that has a length that is greater than an outer radius of said optical recording layer.

6. The optical disc of claim 1, wherein said wear protection layer further comprising a plurality of annular sheets of graphene stacked vertically such that each of said plurality of annular sheets of graphene share a common center point.

7. The optical disc of claim 1, wherein said annular sheet of graphene sheet being attached to said disc with an adhesive.

8. The optical disc of claim 1, wherein said wear protection layer comprises a seed layer upon which said annular sheet of graphene is deposited.

9. The optical disc of claim 1, wherein said annular sheet of graphene is formed of a plurality of annular pie-shaped graphene wedges.

10. The optical disc of claim 1, wherein said matrix is made of a material selected from the group consisting of an adhesive, a glass, a polymer, and a resin.

11. The optical disc of claim 1, further comprising a second annular sheet of graphene, wherein said optical media is positioned between the two annular sheets of graphene.

12. An optical disc, comprising:
    a disc having an optical recording layer; and
    a wear protection layer comprising an annular sheet of graphene embedded within a matrix.

13. The optical disc of claim 12, wherein said matrix is formed of a material that is soluble to facilitate the embedding of said annular sheet of graphene within said matrix when at least a portion of said material is in at least a partially dissolved state.

14. The optical disc of claim 13, wherein said matrix is formed of a material that is softened by flash-heating to facilitate the embedding of said annular sheet of graphene within said matrix when at least a portion of said material is in a softened state.

15. The optical disc of claim 12, wherein said annular sheet of graphene is formed of a single contiguous sheet of graphene.

16. The optical disc of claim 15, wherein said annular sheet of graphene has a uniform thickness, thereby providing uniform transmission of light through said wear protection layer to facilitate uniform reading and writing of information to and from said optical recording layer.

17. The optical disc of claim 12, wherein said annular sheet of graphene is formed of a single contiguous monolayer of carbon atoms.

18. The optical disc of claim 12, wherein a center of said annular sheet of graphene is located at a center of said optical disc, said annular sheet of graphene has an inner radius that has a length that is less than an inner radius of said optical recording layer, and said annular sheet of graphene has an outer radius that has a length that is greater than an outer radius of said optical recording layer.

19. The optical disc of claim 12, wherein said annular sheet of graphene is formed of a plurality of annular pie-shaped graphene wedges.

20. The optical disc of claim 12, further comprising a second annular sheet of graphene, wherein said optical media is positioned between the two annular sheets of graphene.

* * * * *